(12) United States Patent
Filimonov et al.

(10) Patent No.: US 9,865,254 B1
(45) Date of Patent: Jan. 9, 2018

(54) COMPRESSED FINITE STATE TRANSDUCERS FOR AUTOMATIC SPEECH RECOGNITION

(71) Applicant: Amazon Technologies, Inc., Seattle, WA (US)

(72) Inventors: Denis Sergeyevich Filimonov, Seattle, WA (US); Gautam Tiwari, Boston, MA (US); Shaun Nidhiri Joseph, Somerville, MA (US); Ariya Rastrow, Seattle, WA (US)

(73) Assignee: Amazon Technologies, Inc., Seattle, WA (US)

(*) Notice: Subject to any disclaimer, the term of this patent is extended or adjusted under 35 U.S.C. 154(b) by 0 days.

(21) Appl. No.: 15/187,102

(22) Filed: Jun. 20, 2016

Related U.S. Application Data

(60) Provisional application No. 62/301,367, filed on Feb. 29, 2016.

(51) Int. Cl.
| | |
|---|---|
| *G10L 15/00* | (2013.01) |
| *G10L 15/193* | (2013.01) |
| *G10L 15/06* | (2013.01) |
| *G10L 15/02* | (2006.01) |
| *G10L 15/18* | (2013.01) |

(52) U.S. Cl.
CPC ............ *G10L 15/193* (2013.01); *G10L 15/02* (2013.01); *G10L 15/063* (2013.01); *G10L 15/1815* (2013.01); *G10L 15/1822* (2013.01); *G10L 2015/0635* (2013.01)

(58) Field of Classification Search
USPC .................................. 704/231–257, 270–275
See application file for complete search history.

(56) References Cited

U.S. PATENT DOCUMENTS

| | | | |
|---|---|---|---|
| 2005/0288928 A1* | 12/2005 | Bergl | G10L 15/083 704/242 |
| 2014/0180693 A1* | 6/2014 | Bapat | G10L 15/142 704/256.1 |
| 2014/0180694 A1* | 6/2014 | Fastow | G10L 15/02 704/256.1 |

(Continued)

OTHER PUBLICATIONS

Allauzen, et al. "OpenFst: A general and efficient weighted finite-state transducer library." International Conference on Implementation and Application of Automata. Springer Berlin Heidelberg, 2007.

(Continued)

*Primary Examiner* — Jesse Pullias
(74) *Attorney, Agent, or Firm* — Pierce Atwood LLP

(57) ABSTRACT

Compact finite state transducers (FSTs) for automatic speech recognition (ASR). An HCLG FST and/or G FST may be compacted at training time to reduce the size of the FST to be used at runtime. The compact FSTs may be significantly smaller (e.g., 50% smaller) in terms of memory size, thus reducing the use of computing resources at runtime to operate the FSTs. The individual arcs and states of each FST may be compacted by binning individual weights, thus reducing the number of bits needed for each weight. Further, certain fields such as a next state ID may be left out of a compact FST if an estimation technique can be used to reproduce the next state at runtime. During runtime portions of the FSTs may be decompressed for processing by an ASR engine.

20 Claims, 13 Drawing Sheets

(56) References Cited

U.S. PATENT DOCUMENTS

2015/0095026 A1* 4/2015 Bisani ................... G10L 15/08
 704/232
2016/0093297 A1* 3/2016 Deisher ................ G10L 15/285
 704/236

OTHER PUBLICATIONS

Mohri, et al. "Integrated context-dependent networks in very large vocabulary speech recognition." EUROSPEECH. 1999.
Mohri, et al. "Weighted finite-state transducers in speech recognition." Computer Speech & Language 16.1 (2002): 69-88.

* cited by examiner

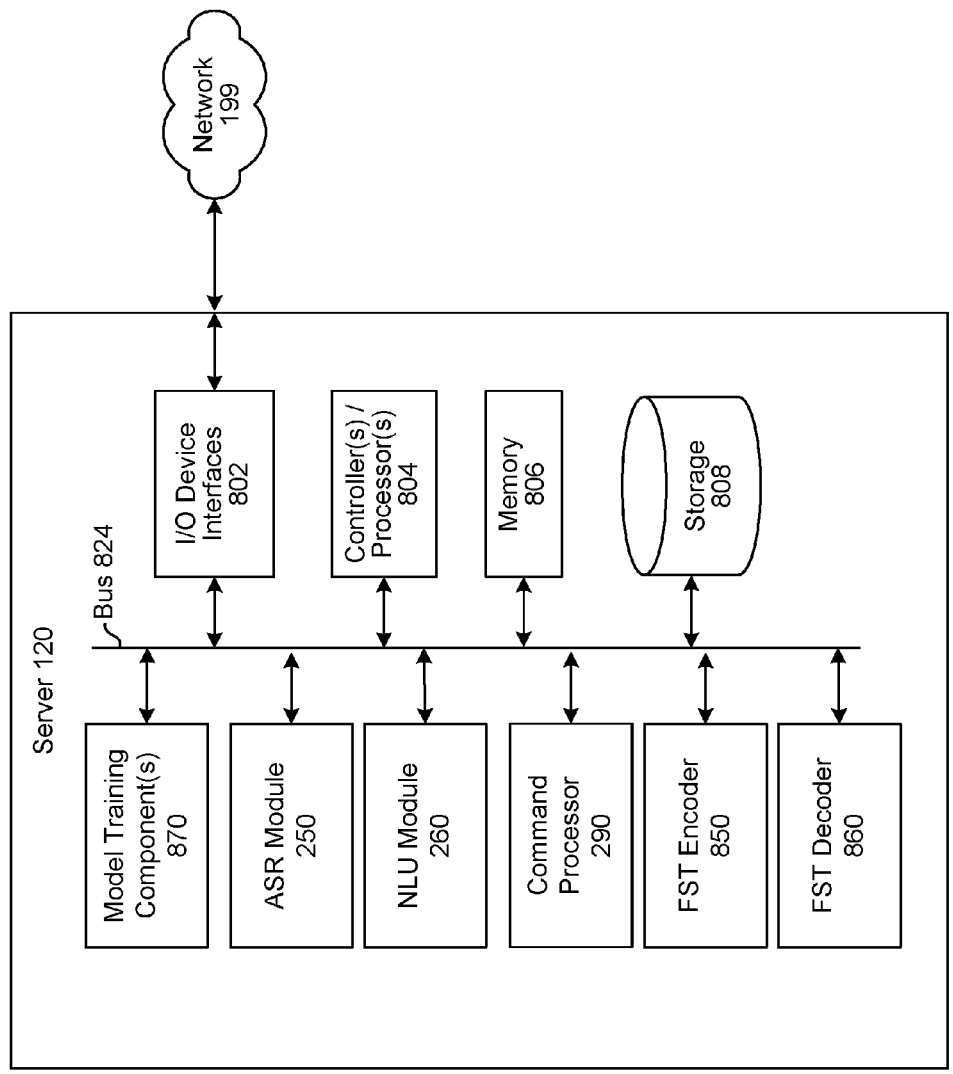

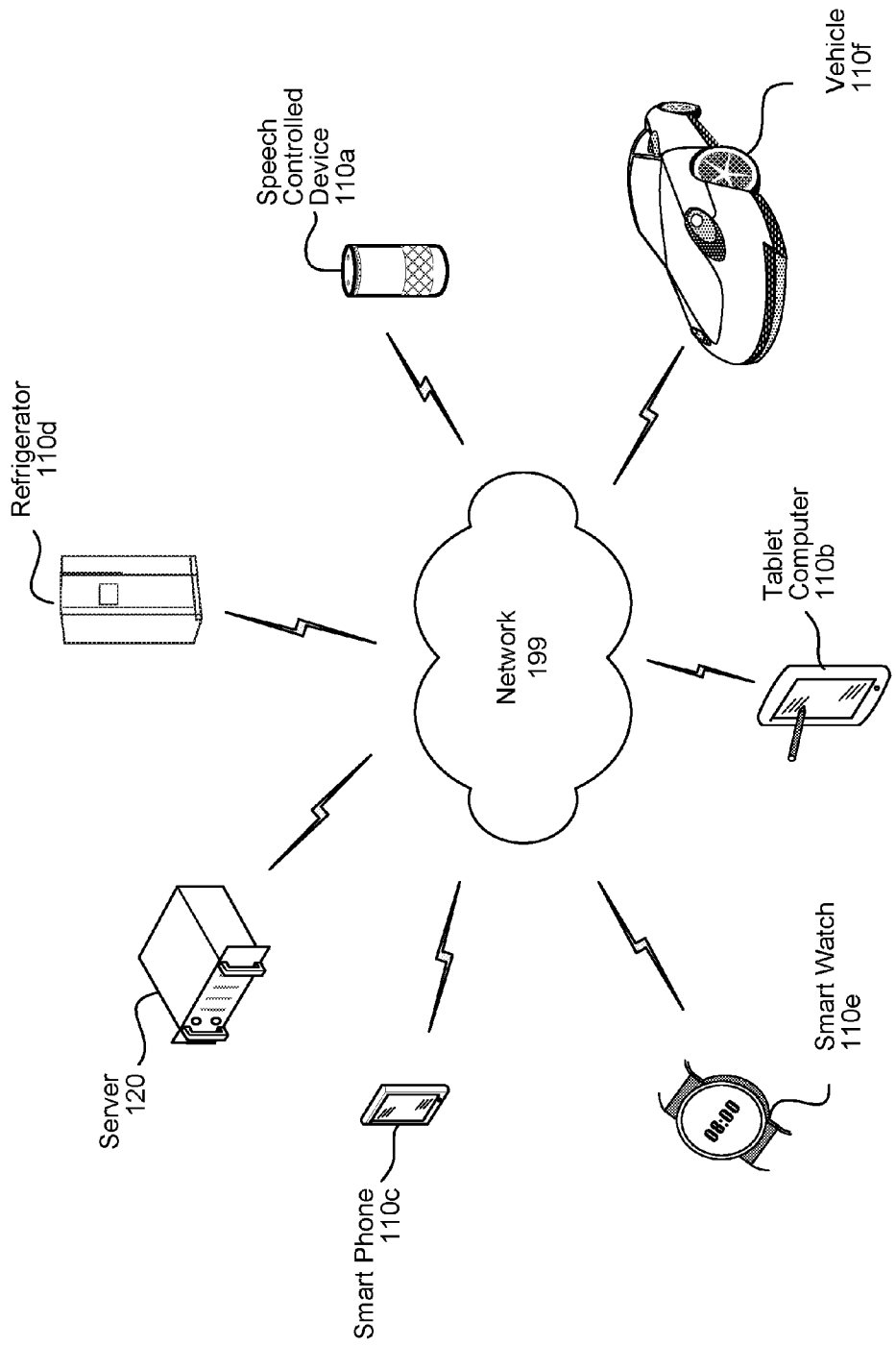

COMPRESSED FINITE STATE TRANSDUCERS FOR AUTOMATIC SPEECH RECOGNITION

CROSS-REFERENCE TO RELATED APPLICATION DATA

This application claims priority to U.S. Provisional Patent Application Ser. No. 62/301,367, entitled "COMPRESSED FINITE STATE TRANSDUCERS FOR AUTOMATIC SPEECH RECOGNITION," filed on Feb. 29, 2016, in the names of Denis Sergeyevich Filimonov et al. The above provisional application is herein incorporated by reference in its entirety.

BACKGROUND

Speech recognition systems have progressed to the point where humans can interact with computing devices entirely relying on speech. Such systems employ techniques to identify the words spoken by a human user based on the various qualities of a received audio input. Speech recognition combined with natural language understanding processing techniques enable speech-based user control of a computing device to perform tasks based on the user's spoken commands. The combination of speech recognition and natural language understanding processing techniques is commonly referred to as speech processing. Speech processing may also convert a user's speech into text data which may then be provided to various text-based software applications.

Speech processing may be used by computers, hand-held devices, telephone computer systems, kiosks, and a wide variety of other devices to improve human-computer interactions.

BRIEF DESCRIPTION OF DRAWINGS

For a more complete understanding of the present disclosure, reference is now made to the following description taken in conjunction with the accompanying drawings.

FIG. 8 is a block diagram conceptually illustrating example components of a server according to embodiments of the present disclosure.

FIG. 9 illustrates an example of a computer network for use with the system.

DETAILED DESCRIPTION

Figure 1:
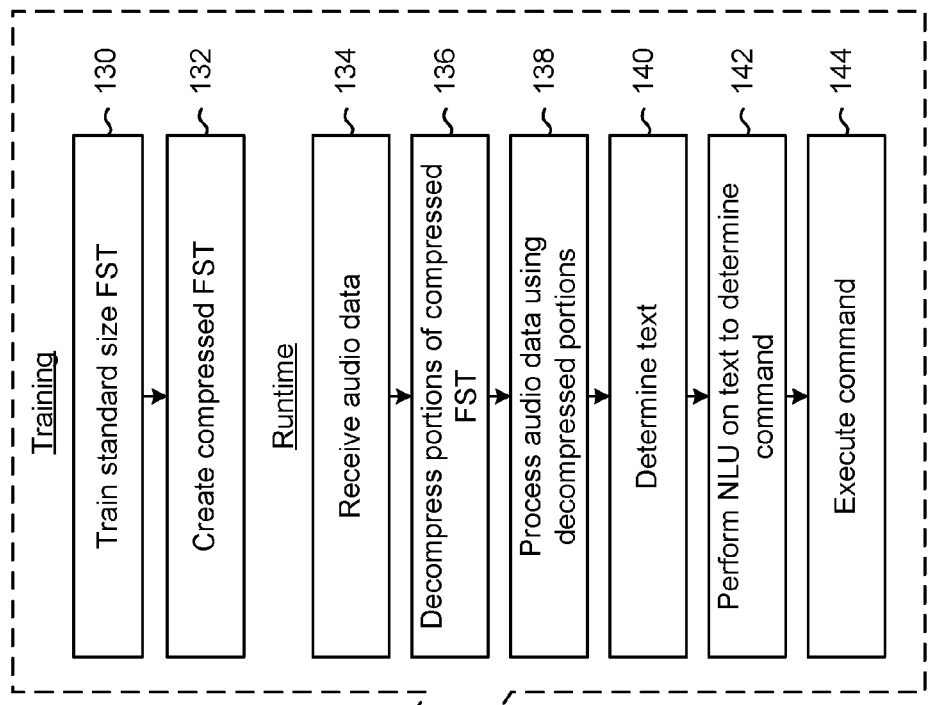
FIG. 1 illustrates a system for creating and using compressed finite state transducers (FSTs) in an automatic speech recognition (ASR) system according to embodiments of the present disclosure.

Automatic speech recognition (ASR) is a field of computer science, artificial intelligence, and linguistics concerned with transforming audio data associated with speech into text representative of that speech. Similarly, natural language understanding (NLU) is a field of computer science, artificial intelligence, and linguistics concerned with enabling computers to derive meaning from text input containing natural language. ASR and NLU are often used together as part of a speech processing system.

ASR and NLU can be computationally expensive. That is, significant computing resources may be needed to process ASR and NLU processing within a reasonable time frame. Because of this, a distributed computing environment may be used to when performing speech processing. An example of such a distributed environment may involve a local client device (e.g., a device in a same environment as a user and capable of capturing spoken commands from the user) having one or more microphones being configured to capture sounds from a user speaking (e.g., "utterances") and convert those sounds into data (e.g., "an audio signal"). The audio signal/data may then be sent to a downstream remote device for further processing, such as converting the audio signal into an ultimate command. The command may then be executed by a combination of remote and local devices depending on the command itself.

Finite State Transducers (FSTs) are widely used in ASR systems to encode different knowledge sources (e.g., models) used during search. In certain aspects an FST may be used to model incoming sounds to words (called an HCL FST, described below). In certain aspects an FST may be used to model words to sentences (called a G FST, or language model/grammar described below). In certain aspects an FST may be used to model incoming sounds to sentences (called an HCLG FST, described below). A language model is a model that indicates how likely certain words are used together, as based on many different example sentences and text available to the system. Such language models may encode a representation of how likely such words or word combinations are likely to be used by a speaker, thus assisting an ASR system in determining the likelihood that a certain word was spoken during an utterance being processed. Such language models are used with acoustic models (that are used to determine a likelihood that a certain detected sound corresponds to a particular acoustic unit) to transform audio data into text.

The size of transducers that include the language model functionality (such as a G FST or HCLG FST), may be proportional to the size of the respective language model(s). Such FST sizes have become an impediment to deploy more complex models (due to runtime resource restrictions). More complex models often result in significant accuracy gains. Offered herein is, among other things, a system for creating and using compressed FSTs to reduce computing resources needed to implement high quality ASR processing.

FIG. 1 shows a system 100 configured to create and use compressed FSTs in an ASR system. Although FIG. 1 and other figures/discussion illustrate the operation of the system in a particular order, the steps described may be performed in a different order (as well as certain steps removed or added) without departing from the intent of the disclosure. As shown in FIG. 1, a system 100 may include one or more devices 110 nearby to user(s) 10, as well as one or more networks 199 and one or more servers 120 connected to device 110 across network(s) 199. The server(s) 120 (which may be one or more different physical devices) may be capable of performing traditional speech processing (such as ASR, NLU, query parsing, etc.) as described herein. A single server may be capable of performing all speech processing or multiple server(s) 120 may combine to perform the speech processing. Further, the server(s) 120 may be configured to execute certain commands, such as answering queries spoken by user 10. In addition, certain speech detection or command execution functions may be performed by device 110.

As shown in FIG. 1, during a training process the system trains (130) a standard size (i.e., uncompressed) FST. As generally used herein, uncompressed may refer to data that is at an original size, without having been compressed. Decompressed may refer to data that has previously been compressed, but has been decompressed to approximate the original size of the data prior to compression. The system then creates (132) a compressed FST that may be decompressed at runtime. The FST may be a complete FST incorporating many aspects of speech recognition tasks (as explained below) or may be a particular FST, such as a language model. The FST may also be for general use or may be customized for a particular user.

After the compressed FST is created, it may be stored and then used at runtime. For example, at runtime a user 10 may speak an utterance (represented by input audio 11) including a query to a device 110. The device 110 may convert the audio 11 into audio data 111 and send the audio data to the server(s) 120. The server(s) 120 may then receive (134) the audio data corresponding to the query and perform ASR processing on the audio data to obtain text. As part of the ASR processing, the system may decompress (136) portions of the compressed FST as described below. The system may then process (138) the audio data using the decompressed portions. The system may determine (140) text resulting from the ASR processing and may perform (142) NLU processing on the text to determine a command. The system may then execute (144) the command.

Figure 2:
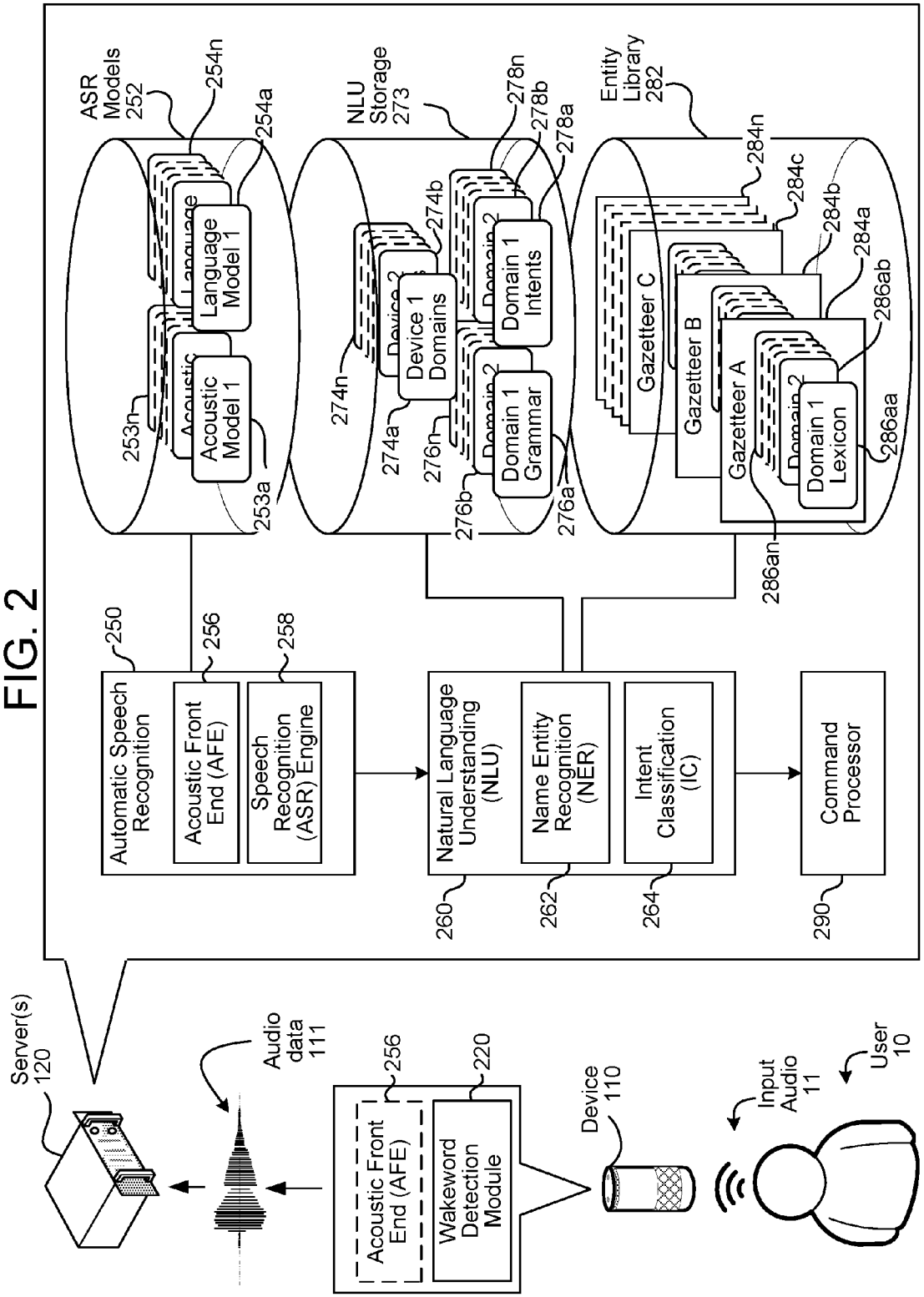
FIG. 2 is a conceptual diagram of a speech processing system according to embodiments of the present disclosure.

Further details are discussed below, following a discussion of the overall speech processing system of FIG. 2. FIG. 2 is a conceptual diagram of how a spoken utterance is traditionally processed, allowing a system to capture and execute commands spoken by a user, such as spoken commands that may follow a wakeword. The various components illustrated may be located on a same or different physical devices. Communication between various components illustrated in FIG. 2 may occur directly or across a network 199. An audio capture component, such as a microphone of device 110, captures audio 11 corresponding to a spoken utterance. The device 110, using a wakeword detection module 220, then processes the audio, or audio data corresponding to the audio, to determine if a keyword (such as a wakeword) is detected in the audio. Following detection of a wakeword, the device sends audio data 111 corresponding to the utterance, to a server 120 that includes an ASR module 250. The audio data 111 may be output from an acoustic front end (AFE) 256 located on the device 110 prior to transmission. Or the audio data 111 may be in a different form for processing by a remote AFE 256, such as the AFE 256 located with the ASR module 250.

The wakeword detection module 220 works in conjunction with other components of the device, for example a microphone (not pictured) to detect keywords in audio 11. For example, the device 110 may convert audio 11 into audio data, and process the audio data with the wakeword detection module 220 to determine whether speech is detected, and if so, if the audio data comprising speech matches an audio signature and/or model corresponding to a particular keyword.

The device 110 may use various techniques to determine whether audio data includes speech. Some embodiments may apply voice activity detection (VAD) techniques. Such techniques may determine whether speech is present in an audio input based on various quantitative aspects of the audio input, such as the spectral slope between one or more frames of the audio input; the energy levels of the audio input in one or more spectral bands; the signal-to-noise ratios of the audio input in one or more spectral bands; or other quantitative aspects. In other embodiments, the device 110 may implement a limited classifier configured to distinguish speech from background noise. The classifier may be implemented by techniques such as linear classifiers, support vector machines, and decision trees. In still other embodiments, Hidden Markov Model (HMM), Gaussian Mixture Model (GMM) or Deep Neural Network (DNN) techniques may be applied to compare the audio input to one or more acoustic models in speech storage, which acoustic models may include models corresponding to speech, noise (such as environmental noise or background noise), or silence. Still other techniques may be used to determine whether speech is present in the audio input.

Once speech is detected in the audio received by the device 110 (or separately from speech detection), the device 110 may use the wakeword detection module 220 to perform wakeword detection to determine when a user intends to speak a command to the device 110. This process may also be referred to as keyword detection, with the wakeword being a specific example of a keyword. Specifically, keyword detection is typically performed without performing linguistic analysis, textual analysis or semantic analysis. Instead, incoming audio (or audio data) is analyzed to determine if specific characteristics of the audio match preconfigured acoustic waveforms, audio signatures, or other data to determine if the incoming audio "matches" stored audio data corresponding to a keyword.

Thus, the wakeword detection module 220 may compare audio data to stored models or data to detect a wakeword. One approach for wakeword detection applies general large vocabulary continuous speech recognition (LVCSR) systems to decode the audio signals, with wakeword searching conducted in the resulting lattices or confusion networks. LVCSR decoding may require relatively high computational resources. Another approach for wakeword spotting involves hidden Markov models (HMM) for each key wakeword word and non-wakeword speech signals respectively. The non-wakeword speech includes other spoken words, background noise, etc. There can be one or more HMMs built to model the non-wakeword speech characteristics, which are named filler models. Viterbi decoding is used to search the best path in the decoding graph, and the decoding output is further processed to make the decision on keyword presence. This approach can be extended to include discriminative information by incorporating hybrid DNN-HMM decoding framework. In another embodiment the wakeword spotting system may be built on deep neural network (DNN)/recursive neural network (RNN) structures directly, without HMM involved. Such a system may estimate the posteriors of wakewords with context information, either by stacking frames within a context window for DNN, or using RNN. Following-on posterior threshold tuning or smoothing is applied for decision making. Other techniques for wakeword detection, such as those known in the art, may also be used.

Once the wakeword is detected, the local device 110 may "wake" and begin transmitting audio data 111 corresponding to input audio 11 to the server(s) 120 for speech processing. Audio data corresponding to that audio may be sent to a server 120 for routing to a recipient device or may be sent to the server for speech processing for interpretation of the included speech (either for purposes of enabling voice-communications and/or for purposes of executing a command in the speech). The audio data 111 may include data corresponding to the wakeword, or the portion of the audio data corresponding to the wakeword may be removed by the local device 110 prior to sending. Further, a local device 110 may "wake" upon detection of speech/spoken audio above a threshold, as described herein. Upon receipt by the server(s) 120, an ASR module 250 may convert the audio data 111 into text. The ASR transcribes audio data into text data representing the words of the speech contained in the audio data. The text data may then be used by other components for various purposes, such as executing system commands, inputting data, etc. A spoken utterance in the audio data is input to a processor configured to perform ASR which then interprets the utterance based on the similarity between the utterance and pre-established language models 254 stored in an ASR model storage 252c. For example, the ASR process may compare the input audio data with models for sounds (e.g., subword units or phonemes) and sequences of sounds to identify words that match the sequence of sounds spoken in the utterance of the audio data.

The different ways a spoken utterance may be interpreted (i.e., the different hypotheses) may each be assigned a probability or a confidence score representing the likelihood that a particular set of words matches those spoken in the utterance. The confidence score may be based on a number of factors including, for example, the similarity of the sound in the utterance to models for language sounds (e.g., an acoustic model 253 stored in an ASR Models Storage 252), and the likelihood that a particular word which matches the sounds would be included in the sentence at the specific location (e.g., using a language or grammar model). Thus each potential textual interpretation of the spoken utterance (hypothesis) is associated with a confidence score. Based on the considered factors and the assigned confidence score, the ASR process 250 outputs the most likely text recognized in the audio data. The ASR process may also output multiple hypotheses in the form of a lattice or an N-best list with each hypothesis corresponding to a confidence score or other score (such as probability scores, etc.).

The device or devices performing the ASR processing may include an acoustic front end (AFE) 256 and a ASR engine 258. The acoustic front end (AFE) 256 transforms the audio data from the microphone into data for processing by the speech recognition engine. The ASR engine 258 compares the speech recognition data with acoustic models 253, language models 254, and other data models and information for recognizing the speech conveyed in the audio data. The AFE may reduce noise in the audio data and divide the digitized audio data into frames representing a time intervals for which the AFE determines a number of values, called features, representing the qualities of the audio data, along with a set of those values, called a feature vector, representing the features/qualities of the audio data within the frame. Typically audio frames may be 10 ms each. Many different features may be determined, as known in the art, and each feature represents some quality of the audio that may be useful for ASR processing. A number of approaches may be used by the AFE to process the audio data, such as mel-frequency cepstral coefficients (MFCCs), perceptual linear predictive (PLP) techniques, neural network feature vector techniques, linear discriminant analysis, semi-tied covariance matrices, or other approaches known to those of skill in the art.

The ASR engine 258 may process the output from the AFE 256 with reference to information stored in speech/model storage (252). Alternatively, post front-end processed data (such as feature vectors) may be received by the device executing ASR processing from another source besides the internal AFE. For example, the device 110 may process audio data into feature vectors (for example using an on-device AFE 256) and transmit that information to a server across a network 199 for ASR processing. Feature vectors may arrive at the server encoded, in which case they may be decoded prior to processing by the processor executing the ASR engine 258.

The ASR engine 258 attempts to match received feature vectors to language phonemes and words as known in the stored acoustic models 253 and language models 254. The ASR engine 258 computes recognition scores for the feature vectors based on acoustic information and language information. The acoustic information is used to calculate an acoustic score representing a likelihood that the intended sound represented by a group of feature vectors matches a language phoneme. The language information is used to adjust the acoustic score by considering what sounds and/or words are used in context with each other, thereby improving the likelihood that the ASR process will output speech results that make sense grammatically. The specific models used may be general models or may be models corresponding to a particular domain, such as music, banking, etc.

The ASR engine 258 may use a number of techniques to match feature vectors to phonemes, for example using Hidden Markov Models (HMMs) to determine probabilities that feature vectors may match phonemes. Sounds received may be represented as paths between states of the HMM and multiple paths may represent multiple possible text matches for the same sound. Further techniques, such as using finite state transducers (FSTs) explained below, may also be used.

Following ASR processing, the ASR results may be sent by the ASR engine 258 to other processing components, which may be local to the device performing ASR and/or distributed across the network(s) 199. For example, ASR results in the form of a single textual representation of the speech, an N-best list including multiple hypotheses and respective scores, lattice, etc. may be sent to a server, such as server 120, for natural language understanding (NLU) processing, such as conversion of the text into commands for execution, either by the device 110, by the server 120, or by another device (such as a server running a specific application like a search engine, etc.).

The device performing NLU processing 260 (e.g., server 120) may include various components, including potentially dedicated processor(s), memory, storage, etc. A device configured for NLU processing may include a named entity recognition (NER) module 252 and intent classification (IC) module 264, a result ranking and distribution module 266, and NLU storage 273. The NLU process may also utilize gazetteer information (284a-284n) stored in entity library storage 282. The gazetteer information may be used for entity resolution, for example matching ASR results with different entities (such as song titles, contact names, etc.) Gazetteers may be linked to users (for example a particular gazetteer may be associated with a specific user's music collection), may be linked to certain domains (such as shopping), or may be organized in a variety of other ways.

The NLU process takes textual input (such as processed from ASR 250 based on the utterance 11) and attempts to make a semantic interpretation of the text. That is, the NLU process determines the meaning behind the text based on the individual words and then implements that meaning. NLU processing 260 interprets a text string to derive an intent or a desired action from the user as well as the pertinent pieces of information in the text that allow a device (e.g., device 110) to complete that action. For example, if a spoken utterance is processed using ASR 250 and outputs the text "call mom" the NLU process may determine that the user intended to activate a telephone in his/her device and to initiate a call with a contact matching the entity "mom."

The NLU may process several textual inputs related to the same utterance. For example, if the ASR 250 outputs N text segments (as part of an N-best list), the NLU may process all N outputs to obtain NLU results.

The NLU process may be configured to parse and tag text as part of NLU processing. For example, for the text "call mom," "call" may be tagged as a command (to execute a phone call) and "mom" may be tagged as a specific entity and target of the command (and the telephone number for the entity corresponding to "mom" stored in a contact list may be included in the annotated result). Thus, certain data may be associated with the word "call" indicating that it corresponds to a command and other data may be associated with the word "mom" indicating that it corresponds to an entity.

To correctly perform NLU processing of speech input, the NLU process 260 may be configured to determine a "domain" of the utterance so as to determine and narrow down which services offered by the endpoint device (e.g., server 120 or device 110) may be relevant. For example, an endpoint device may offer services relating to interactions with a telephone service, a contact list service, a calendar/scheduling service, a music player service, etc. Words in a single text query may implicate more than one service, and some services may be functionally linked (e.g., both a telephone service and a calendar service may utilize data from the contact list).

The name entity recognition module 262 receives a query in the form of ASR results and attempts to identify relevant grammars and lexical information that may be used to construe meaning. To do so, a name entity recognition module 262 may begin by identifying potential domains that may relate to the received query. The NLU storage 273 includes a databases of devices (274a-274n) identifying domains associated with specific devices. For example, the device 110 may be associated with domains for music, telephony, calendaring, contact lists, and device-specific communications, but not video. In addition, the entity library may include database entries about specific services on a specific device, either indexed by Device ID, User ID, or Household ID, or some other indicator.

A domain may represent a discrete set of activities having a common theme, such as "shopping", "music", "calendaring", etc. As such, each domain may be associated with a particular language model and/or grammar database (276a-276n), a particular set of intents/actions (278a-278n), and a particular personalized lexicon (286). Each gazetteer (284a-284n) may include domain-indexed lexical information associated with a particular user and/or device. For example, the Gazetteer A (284a) includes domain-index lexical information 286aa to 286an. A user's music-domain lexical information might include album titles, artist names, and song names, for example, whereas a user's contact-list lexical information might include the names of contacts. Since every user's music collection and contact list is presumably different, this personalized information improves entity resolution.

A query is processed applying the rules, models, and information applicable to each identified domain. For example, if a query potentially implicates both communications and music, the query will be NLU processed using the grammar models and lexical information for communications, and will be processed using the grammar models and lexical information for music. The responses based on the query produced by each set of models is scored (discussed further below), with the overall highest ranked result from all applied domains is ordinarily selected to be the correct result.

An intent classification (IC) module 264 parses the query to determine an intent or intents for each identified domain, where the intent corresponds to the action to be performed that is responsive to the query. Each domain is associated with a database (278a-278n) of words linked to intents. For example, a music intent database may link words and phrases such as "quiet," "volume off," and "mute" to a "mute" intent. The IC module 264 identifies potential intents for each identified domain by comparing words in the query to the words and phrases in the intents database 278.

In order to generate a particular interpreted response, the NER 262 applies the grammar models and lexical information associated with the respective domain. Each grammar model 276 includes the names of entities (i.e., nouns) commonly found in speech about the particular domain (i.e., generic terms), whereas the lexical information 286 from the gazetteer 284 is personalized to the user(s) and/or the device. For instance, a grammar model associated with the shopping domain may include a database of words commonly used when people discuss shopping.

The intents identified by the IC module 264 are linked to domain-specific grammar frameworks (included in 276) with "slots" or "fields" to be filled. For example, if "play music" is an identified intent, a grammar (276) framework or frameworks may correspond to sentence structures such as "Play {Artist Name}," "Play {Album Name}," "Play {Song name}," "Play {Song name} by {Artist Name}," etc. However, to make recognition more flexible, these frameworks would ordinarily not be structured as sentences, but rather based on associating slots with grammatical tags.

For example, the NER module 260 may parse the query to identify words as subject, object, verb, preposition, etc., based on grammar rules and models, prior to recognizing named entities. The identified verb may be used by the IC module 264 to identify intent, which is then used by the NER module 262 to identify frameworks. A framework for an intent of "play" may specify a list of slots/fields applicable to play the identified "object" and any object modifier (e.g., a prepositional phrase), such as {Artist Name}, {Album Name}, {Song name}, etc. The NER module 260 then searches the corresponding fields in the domain-specific and personalized lexicon(s), attempting to match words and phrases in the query tagged as a grammatical object or object modifier with those identified in the database(s).

This process includes semantic tagging, which is the labeling of a word or combination of words according to their type/semantic meaning. Parsing may be performed using heuristic grammar rules, or an NER model may be constructed using techniques such as hidden Markov models, maximum entropy models, log linear models, conditional random fields (CRF), and the like.

For instance, a query of "play mother's little helper by the rolling stones" might be parsed and tagged as {Verb}: "Play," {Object}: "mother's little helper," {Object Preposition}: "by," and {Object Modifier}: "the rolling stones." At this point in the process, "Play" is identified as a verb based on a word database associated with the music domain, which the IC module 264 will determine corresponds to the "play music" intent. No determination has been made as to the meaning of "mother's little helper" and "the rolling stones,"

but based on grammar rules and models, it is determined that these phrase relate to the grammatical object of the query.

The frameworks linked to the intent are then used to determine what database fields should be searched to determine the meaning of these phrases, such as searching a user's gazette for similarity with the framework slots. So a framework for "play music intent" might indicate to attempt to resolve the identified object based {Artist Name}, {Album Name}, and {Song name}, and another framework for the same intent might indicate to attempt to resolve the object modifier based on {Artist Name}, and resolve the object based on {Album Name} and {Song Name} linked to the identified {Artist Name}. If the search of the gazetteer does not resolve the a slot/field using gazetteer information, the NER module 262 may search the database of generic words associated with the domain (in the NLU's storage 273). So for instance, if the query was "play songs by the rolling stones," after failing to determine an album name or song name called "songs" by "the rolling stones," the NER 262 may search the domain vocabulary for the word "songs." In the alternative, generic words may be checked before the gazetteer information, or both may be tried (either serially or in parallel), potentially producing two different results.

The comparison process used by the NER module 262 may classify (e.g., score) how closely a database entry compares to a tagged query word or phrase, how closely the grammatical structure of the query corresponds to the applied grammatical framework, and (based on, e.g., whether the database indicates a relationship between an entry and information identified) to fill other slots of the framework.

The NER modules 262 may also use contextual operational rules to fill slots. For example, if a user had previously requested to pause a particular song and thereafter requested that the voice-controlled device to "please un-pause my music," the NER module 262 may apply an inference-based rule to fill a slot associated with the name of the song that the user currently wishes to play—namely the song that was playing at the time that the user requested to pause the music.

The results of NLU processing may be tagged to attribute meaning to the query. So, for instance, "play mother's little helper by the rolling stones" might produce a result of: {domain} Music, {intent} Play Music, {artist name} "rolling stones," {media type} SONG, and {song title} "mother's little helper." As another example, "play songs by the rolling stones" might produce: {domain} Music, {intent} Play Music, {artist name} "rolling stones," and {media type} SONG.

The output from the NLU processing (which may include tagged text, commands, etc.) may then be sent to a command processor 290, which may be located on a same or separate server 120 as part of system 100. The destination command processor 290 may be determined based on the NLU output. For example, if the NLU output includes a command to play music, the destination command processor 290 may be a music playing application, such as one located on device 110 or in a music playing appliance, configured to execute a music playing command. If the NLU output includes a search request, the destination command processor 290 may include a search engine processor, such as one located on a search server, configured to execute a search command.

As discussed above, during ASR processing the ASR engine 258 attempts to match received feature vectors to words or subword units. A subword unit may be a phoneme, phoneme in context, syllable, part of a syllable, syllable in context, or any other such portion of a word. The ASR engine 258 computes recognition scores for the feature vectors based on acoustic information and language information. The acoustic information is used to calculate an acoustic score representing a likelihood that the intended sound represented by a group of feature vectors match a subword unit. The language information is used to adjust the acoustic score by considering what sounds and/or words are used in context with each other, thereby improving the likelihood that the ASR module outputs speech results that make sense grammatically.

The ASR engine 258 may use a number of techniques to match feature vectors to phonemes or other phonetic units, such as biphones, triphones, etc. One common technique is using Hidden Markov Models (HMMs). HMMs are used to determine probabilities that feature vectors may match phonemes. Using HMMs, a number of states are presented, in which the states together represent a potential phoneme (or other speech unit, such as a triphone) and each state is associated with a model, such as a Gaussian mixture model or a deep belief network. Transitions between states may also have an associated probability, representing a likelihood that a current state may be reached from a previous state. Sounds received may be represented as paths between states of the HMM and multiple paths may represent multiple possible text matches for the same sound. Each phoneme may be represented by multiple potential states corresponding to different known pronunciations of the phonemes and their parts (such as the beginning, middle, and end of a spoken language sound). An initial determination of a probability of a potential phoneme may be associated with one state. As new feature vectors are processed by the ASR engine 258, the state may change or stay the same, based on the processing of the new feature vectors. A Viterbi algorithm may be used to find the most likely sequence of states based on the processed feature vectors.

In one example, the ASR engine 258 may receive a series of feature vectors for sound corresponding to a user saying "There is a bat in my car." The ASR engine 258 may attempt to match each feature vector with a phoneme. As new feature vectors are processed, the ASR engine 258 may determine state transitions (for example, using HMMs) to determine whether a probability of whether a state should either remain the same, or change to a new state, i.e., whether an incoming feature vector results in a state transition from one phone to another. As the processing continues, the ASR engine 258 continues calculating such state transition probabilities. After processing one feature vector, the speech recognition may move to the next feature vector.

Probabilities and states may be calculated using a number of techniques. For example, probabilities for each state may be calculated using a Gaussian model, Gaussian mixture model, or other technique based on the feature vectors. Techniques such as maximum likelihood estimation (MLE) may be used to estimate the probability of phoneme states.

In addition to calculating potential states for one phoneme as a potential match to a feature vector, the ASR engine 258 may also calculate potential states for other phonemes. In this manner multiple states and state transition probabilities may be calculated.

The probable states and probable state transitions calculated by the ASR engine 258 are formed into paths. Each path represents a progression of phonemes that potentially match the audio data represented by the feature vectors. One path may overlap with one or more other paths depending on the recognition scores calculated for each phoneme. Certain probabilities are associated with each transition from state to state. A cumulative path score may also be calculated for each path. When combining scores as part of the ASR processing, scores may be multiplied together (or combined in other ways) to reach a desired combined score or probabilities may be converted to the log domain and added to assist processing.

The ASR engine 258 may also compute scores of branches of the paths based on language models or grammars. Language modeling involves determining scores for what words are likely to be used together to form coherent words and sentences. Application of a language model may improve the likelihood that the ASR module 250 correctly interprets the speech contained in the audio data. For example, acoustic model processing returning the potential phoneme paths of "B A T", "B A D", and "B E D" may be adjusted by a language model to adjust the recognition scores of "B A T" (interpreted as the word "bat"), "B A D" (interpreted as the word "bad"), and "B E D" (interpreted as the word "bed") based on the language context of each word within the spoken utterance. The language modeling may be determined from a text corpus and may be customized for particular applications.

Figure 3:
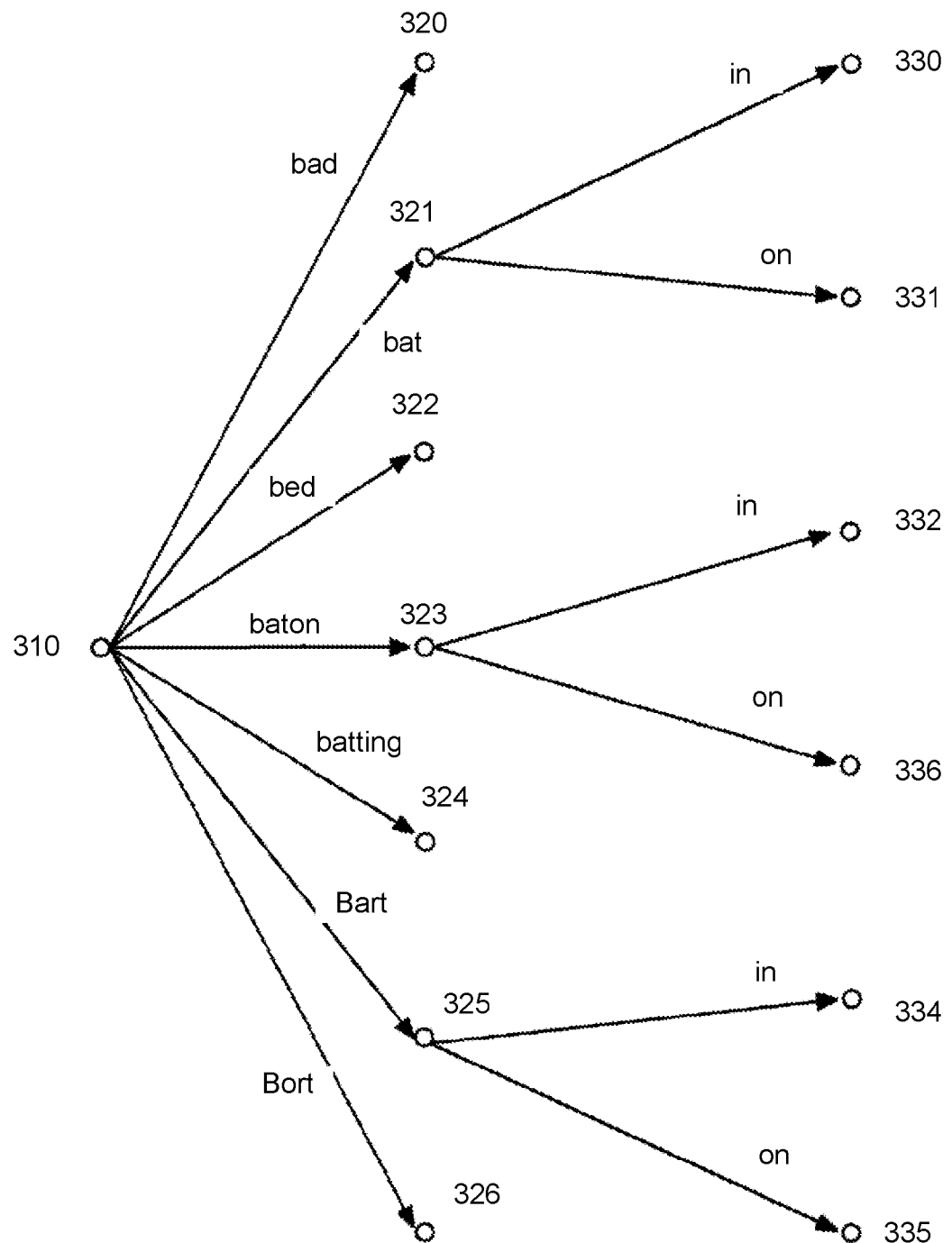
FIG. 3 illustrates a word result network according to embodiments of the present disclosure.

As the ASR engine 258 determines potential words from the input audio the lattice may become very large as many potential sounds and words are considered as potential matches for the input audio. The potential matches may be illustrated as a word result network representing possible sequences of words that may be recognized and the likelihood of each sequence. FIG. 3 shows an example of a word result network that may be used by a ASR engine 258 for recognizing speech according to some aspects of the present disclosure. A word result network may consist of sequences of words that may be recognized and the likelihood of each sequence. The likelihood of any path in the word result network may be determined by an acoustic model and a language model. In FIG. 3, the paths shown include, for example, "bad", "bat in", "bat on", "bed", "baton in", "baton on", "batting", "Bart in", "Bart on", and "Bort".

As illustrated in FIG. 3, a word result network may start at initial node 310. At node 310, no words may have been recognized yet as the ASR engine 258 commences its processing. From node 310, the ASR engine 258 may create arcs and additional nodes where each arc may be associated with a potential word that may be recognized. In some applications, words may be represented by nodes instead of arcs. In FIG. 3, arcs from node 310 to nodes 320 to 326 are labeled with example words that may be recognized by the ASR engine 258.

From initial node 310, the ASR engine 258 may apply acoustic and language models to determine which of the arcs leaving node 310 are most likely to occur. For an acoustic model employing HMMs, ASR engine 258 may create a separate HMM for each arc leaving node 310. Applying the acoustic and language models the ASR engine 258 may decide to pursue some subset of the arcs leaving node 310. For example, in FIG. 3, the ASR engine 258 may decide to follow the paths starting with "bad", "bat", and "bed" and may decide to stop pursuing the paths starting with "baton", "batting", "Bart," and "Bort" based on the respective scores of those arc, with the ASR engine 258 pursuing only the higher scoring arcs in an effort to concentrate computing resources on the arcs most likely to result in a correct result.

The ASR engine 258 may return an N-best list of paths along with their respective recognition scores, corresponding to the top N paths as determined by the ASR engine 258. An application (such as a program or component either internal or external to the ASR device 302) that receives the N-best list may then perform further operations or analysis on the list given the list and the associated recognition scores. For example, the N-best list may be used in correcting errors and training various options and processing conditions of the ASR module 250. The ASR engine 258 may compare the actual correct utterance with the best result and with other results on the N-best list to determine why incorrect recognitions received certain recognition scores. The ASR engine 258 may correct its approach (and may update information in the ASR models 252) to reduce the recognition scores of incorrect approaches in future processing attempts.

In one aspect of the disclosure, the ASR engine 258 may use a finite state transducer (FST) to perform speech recognition. An FST is a graph that may include all possible words that may be recognized by the ASR engine 258. While the word result network of FIG. 3 may be created dynamically to recognize words, an FST may be static in that it is created in advance and the same FST may be used for the recognition of all utterances.

An FST may include paths for all sequences of words that may be recognized. The creation of an FST may be visualized by starting with the word result network of FIG. 3. The word result network of FIG. 3 may be built out to include all possible utterances that could be recognized by the ASR engine 258. Such a word result network would be potentially unbounded in size unless there was a limitation on the length of utterances that could be recognized. If the lexicon consisted of 100,000 words, there may be 100,000 arcs leaving the initial node of the node of the word result network. For each of the initial words, there may be 100,000 words that could follow. Thus, after only two words, there may be as many as 10 billion paths through the word result network. As utterances of three or more words are included, the size of the word result network will grow considerably larger.

An FST may allow for the recognition of all the words in the above word result network, but may do so with a graph that is smaller than the word result network. An FST may be smaller because it may have cycles and/or it may be determined and/or minimized. An FST may be determined if, for each node in the FST, each arc exiting the node has a different label. An FST may be minimized if it has the minimum number of possible nodes. For example, depending on the application, a given word may appear only once in an FST, and an FST may be cyclical so that a given arc of the FST may be traversed more than once for a single utterance. For other applications, words may appear in an FST more than once so that that context of the word may be distinguished. Although the above example considered an FST of words, an FST may represent sequences of other types, such as sequences of HMMs or HMM states. A larger FST may be creating by composing other FSTs. For example, an FST that includes words and phones may be created by composing an FST of words with an FST of phones.

In certain aspects, different finite state transducers (FSTs) are used for different speech processing tasks. One FST may be used for Hidden Markov Model (HMM) operations to input model temporal dynamics of speech such as phone duration (referred to as an "H" FST). Another FST may be used to model phonotactic context dependency (referred to as a "C" FST). Another FST may be the language FST used to map sequences of phones to words (referred to as an "L" FST). Finally, another FST, known as the grammar, models individual words to sequences of words that are likely to be used together (referred to as a "G" FST). Thus, the H FST transduces an audio feature vectors (corresponding to audio frames) into context dependent phones, the C FST enforces usage constraints and transduces context dependent phones to context independent phones, the L FST transduces context independent phones to words and the G FST transduces words to words that are likely to make sense together, as according to a language model.

In certain situations certain operations may be grouped into a large FST that incorporates the different operations such as an HCLG FST that incorporates all of the above operations, thus yielding a final search graph that is the composition of the above FSTs. In other situations the operations are grouped differently, where one FST is an HCL FST and another FST is a G FST. This configuration may be useful for domain-specific or user-specific (or other customized) grammars (i.e., G FSTs) that can be swapped in or out for different incoming speech requests, and paired with an existing HCL FST to obtain desired speech results. A user-customized FST may be created by capturing information about how a user interacts with a voice-controlled system and noting what words are typically spoken by a user to a device. The system may then customize an FST by weighting more heavily word sequences frequently spoken by a user and/or including user-favored words in an FST that may otherwise not be included.

An FST may generally be constructed based on a text corpus that includes a large amount of text representing sentences that may be spoken by users. The FST is thus constructed so that it may represent a large number (though not necessarily infinite) number of potential sentences that may be spoken. The FST may be sufficiently granular, however, that each state may represent a particular acoustic unit (such as a senon, phoneme, etc.). Thus, each state of the FST may represent a portion in the progression of potential incoming sounds and how those sounds relate to spoken words. As incoming feature vectors corresponding to audio frames are processed by the ASR engine 258, it may travel from state to state along arcs of the FST. States/arcs that are traversed (and not pruned) are preserved to form a lattice. As each state of the FST is processed by a ASR engine 258, the engine 258 may keep track of the information associated with that portion of the FST (represented by outgoing labels on the arcs between FST states) to build the likely ASR result. Thus, words corresponding to traversed outgoing arcs may be used to construct the lattice, and from the lattice an N best list of potential ASR results.

The FST is thus a directed graph where each arc has certain properties such as input labels, output labels, a weight associated with each arc, and an end state where the arc leads. As feature vectors for audio frames are processed by the ASR engine 258, it may traverse the FST to form a lattice representing potential speech recognition results. A lattice may also be formed using the acoustic models and language model described above. In the context of an FST, as the ASR engine 258 traverses through states in the FST, it may assign a score to each state or arc on the FST. After traversing an arc, the weight of the arc of the FST, the weight of the arc may be added to the total cost of the path leading to that arc. To save computational resources, the ASR engine 258 may prune and discard low recognition score states or paths that have little likelihood of corresponding to the spoken utterance, either due to low recognition scores, or for other reasons. Thus a certain number of states may be preserved for each frame, and those states may be connected to states associated with the next frame (that survived a pruning), thus ultimately resulting in multiple paths through the FST representing potential speech recognition results. After traversing the FST, the path with the best score (which may be the highest score or lowest score depending on the configuration of the FST) may be selected as the most likely path.

FIGS. 4A-4D illustrate different a small section of an ASR FST. In particular, FIGS. 4A-4D a small portion of an HCLG FST that may be traversed when processing audio data representing speech and determining whether that audio data corresponds to the word "bat" or the word "bad." (Although a full HCLG FST may be configured to transduce acoustic units to full sentences, only a portion of an HCLG FST is shown for illustration purposes. Thus while FIGS. 4A-4D are illustrative, an implemented full HCLG FST may have certain differences from the portions shown.) The FST portion shows a single start state (state 0 shown in FIG. 4A) and multiple end states (states 62, 68, 69, 81, 82, and 83, shown in FIGS. 4C and 4D). In a full FST for speech processing there may be one or multiple start states and many more end states. Further, the end states may be located at various locations throughout the FST to represent different potential end portions that may be received by a potential utterance.

As can be seen in FIGS. 4A-4D, each state has one or more arcs outgoing from it that lead from the particular state to the next state. Each arc is associated with an input label, an output label and a score, shown in the figures as [input label]:[output label]/[score]. Thus, for example, arc 402 outgoing from state 0 to state 2 has an input label of 10, an output label of <eps> (explained below) and a score of 0.15137. The scores illustrated in FIGS. 4A-4D the scores represent scores or "costs" of each arc, where a lower scoring arc represents an arc that is more likely to be traversed/chosen than a higher scoring arc. In the present illustration of FIGS. 4A-4D, the illustrated scores roughly correspond to the negative logarithm of the probability the particular arc may be traversed, but multiple scoring configurations are possible. Further, the scores illustrated in FIGS. 4A-4D represent scores of the arcs in the FST prior to ASR processing. During processing, those scores will be adjusted using the scores of the acoustic model, as explained below. Although the scores illustrated represent one way of scoring arcs, other techniques may also be used. Further, while lower scores illustrated in FIGS. 4A-4D are considered "better," as in, more likely to be selected during ASR, in other configurations higher scores may be considered more likely to be selected.

As noted below, the input labels and output labels of an arc in an FST may include pointers to tables that track the individual labels. Further, for an ASR FST such as that illustrated in FIGS. 4A-4D, the input labels may correspond to individual acoustic speech units such as phonemes or senons or portions thereof. A senon is a grouping of HMM states which represents a particular grouping of phones as may be used together in speech. Each phone may have a number of incrementally different sounds depending on its context (e.g., the surrounding phones). While English may have approximately 50 phones it has several thousand sound groupings represented by senons. Use of senons in ASR processing may allow for improved ASR results. Thus, for example, arc 402 outgoing from state 0 in FIG. 4A has an input label of 10. That may correspond to entry 10 of an input label table, which in term may correspond to a particular phoneme or portion thereof, for example corresponding to a beginning of a "b" sound as might be spoken in "bat." Further remaining input labels on arcs outgoing from state 0 (4 in arc 404 from state 0 to state 3, 5480 in arc 406 outgoing from state 0 to state 5, 16 in arc 408 outgoing from state 0 to state 1, and 2 in arc 410 outgoing from state 0 to state 4) may each represent different acoustic units that may be identified by an acoustic model. In the example of the figures, these input labels may also correspond to different speech units that represent different ways of making a "b" sound. As the FST is traversed during ASR (explained below), the system may use the input labels to determine how to traverse the FST (based on the output from the acoustic model).

The output labels of the arcs may be collected by the ASR engine 258 for eventual use in outputting ASR results. As can be appreciated by FIGS. 4A-4D, however, many arcs have a label <eps> (either as input label or as output label) which represents the label epsilon (ϵ). Epsilon is representative of a null label. That is, arcs with <eps> as an output label, have no output label and thus do not contribute any words to a potential ASR result. Arcs with <eps> as an input label do not need acoustic input to be traversed, and thus may be traversed as part of ASR processing without a new input audio feature vector. For example, if the ASR engine 258 reaches state 10, it may traverse arc 430 from state 10 to state 15 as there is no input label on that arc that refers to an indexed acoustic unit. The ASR engine 258, however, will not traverse arc 432 outgoing from state 15 until a new audio feature vector is processed, as arc 432 has an input label of 5570, which refers to an acoustic unit, thus requiring a new audio feature vector be processed before arc 432 is traversed.

Only certain portions of an FST have an output label. For example, as shown in FIG. 4B, only arcs 440 and 442 have an output label. Arc 440, from state 23 to state 26 has an output label of "bad" and arc 442 from state 23 to state 27 has an output label of "bat." Because the FST portion of FIGS. 4A-4D only illustrate choosing between the words "bad" and "bat", the output labels corresponding to "bad" and "bat" are located at the point in the illustrated FST portion branches between the two words. Thus, only after the speech recognition system 258 has traversed those particular arcs (which can only be reached if the system traverses the arcs before), will the speech recognition system 258 output either the word "bat" or the word "bad" (with a corresponding score) from the FST. As can be appreciated, many states and arcs may be traversed before a word is output using an FST during ASR. This logically follows from the understanding that certain states of an FST may be correspond to a single audio frame, and an audio frame may be only 10 ms long. Thus many frames (and states) need to be processed before a word may be recognized.

During runtime ASR processing, the ASR engine 258 may take incoming audio feature vectors corresponding to audio frames and may process them with an acoustic model 253. For each processed feature vector, the acoustic model processing will then result in acoustic model output including a list of potential acoustic units corresponding to the feature vector along with a corresponding list of acoustic scores for the respective potential acoustic units. The ASR engine 258 will then identify those acoustic units in the input labels of particular states currently under consideration at the FST and will rescore the arcs associated with those acoustic units using both the acoustic scores and the scores of the arcs built into the FST.

Figure 4A:
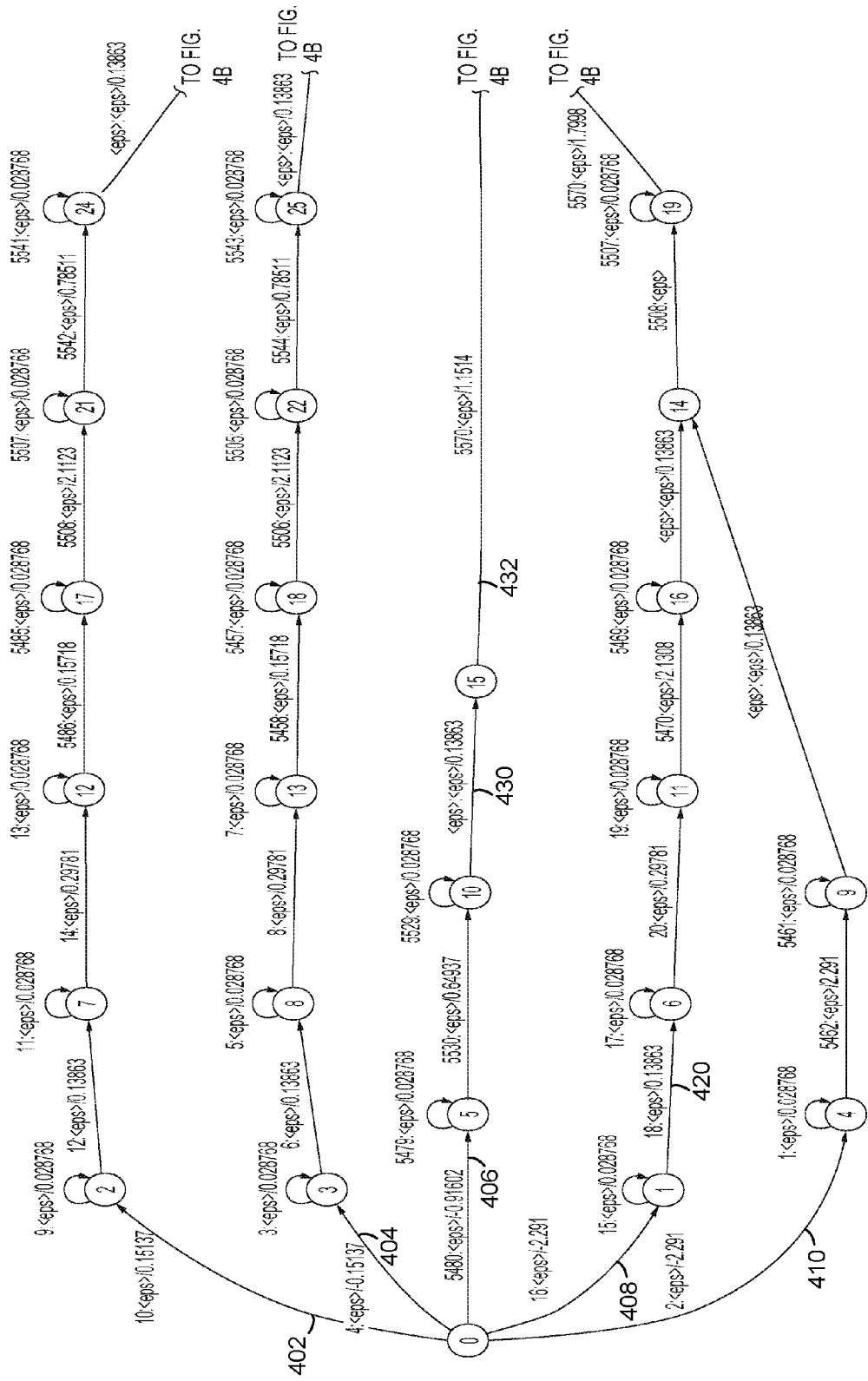
FIGS. 4A-4D illustrate a section of a finite state transducer according to embodiments of the present disclosure.
Figure 4B:
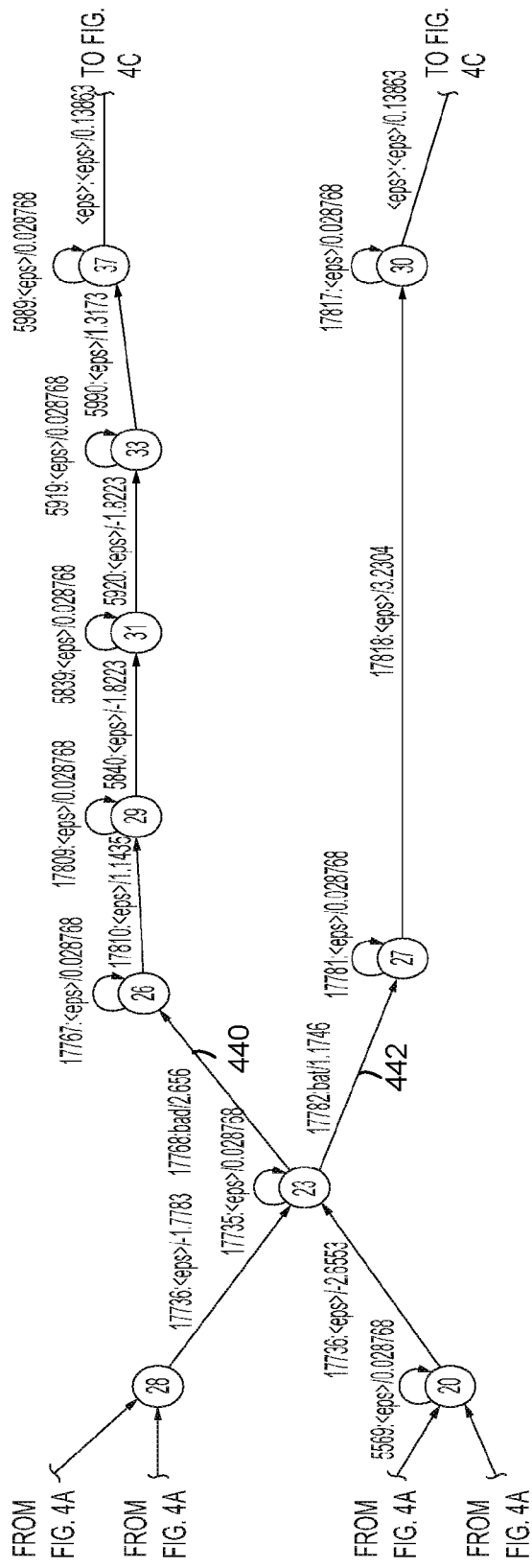
Figure 4C:
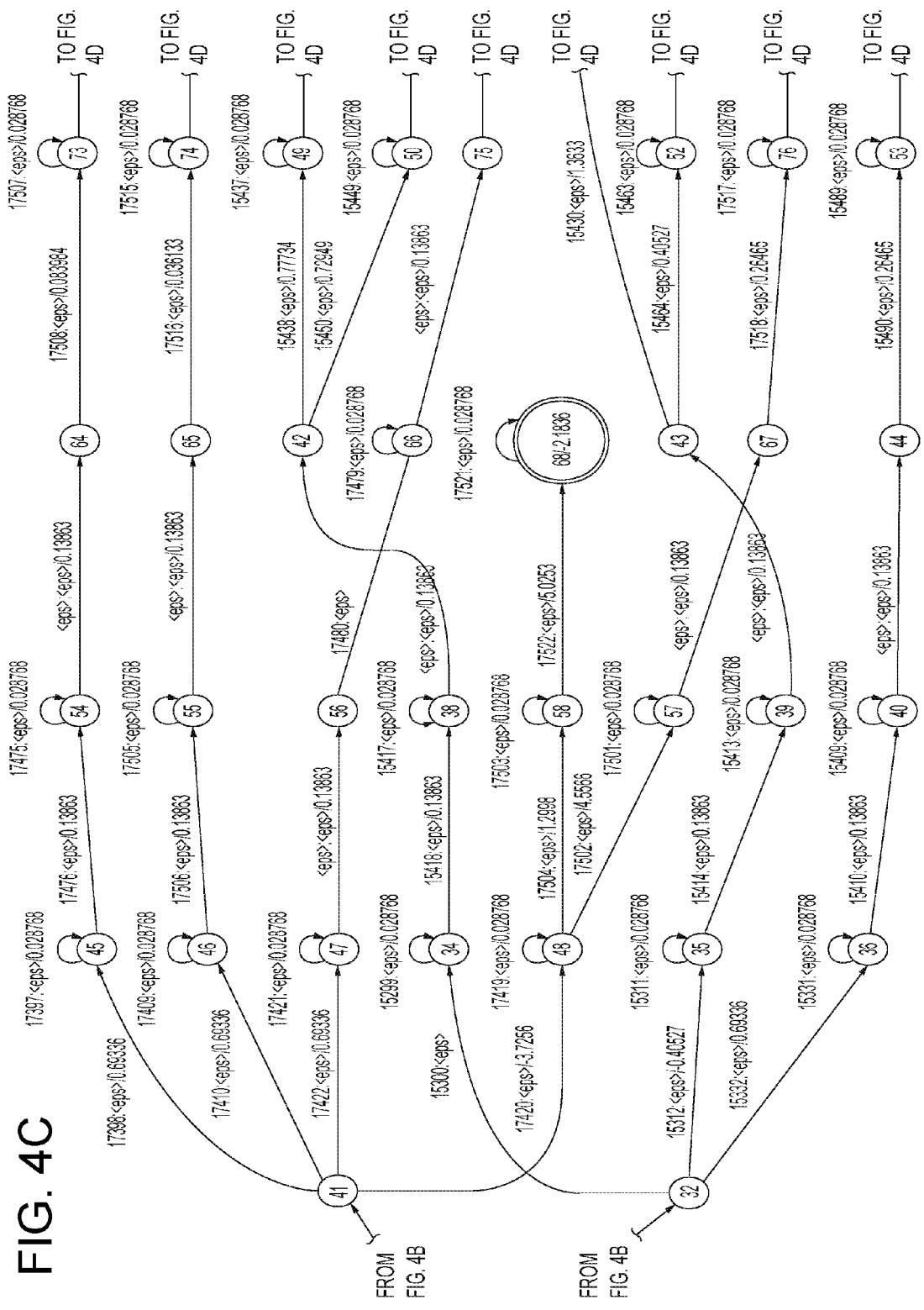
Figure 4D:
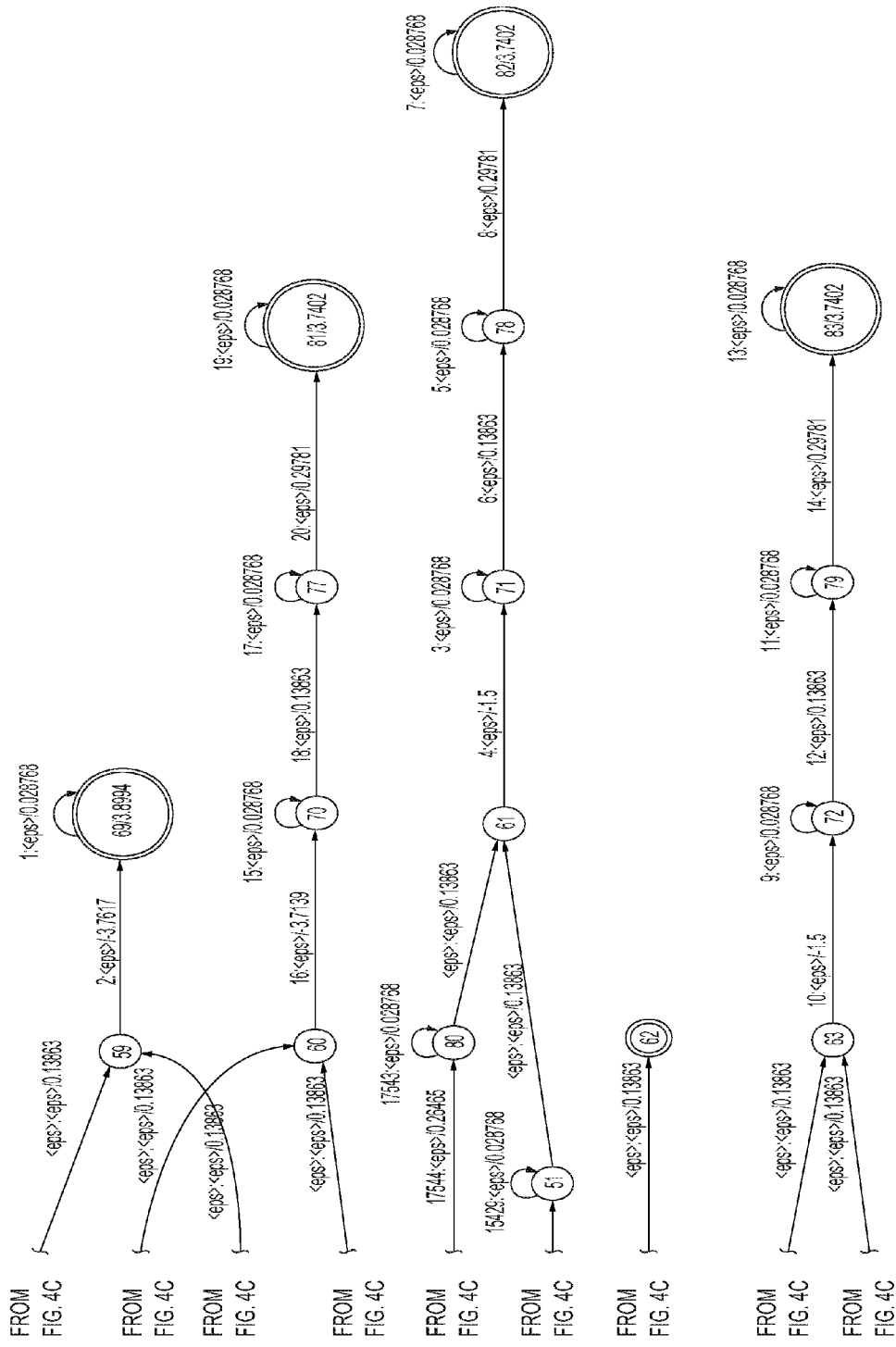

Take, for example, state 0 of FIG. 4A as an active state being considered as part of ASR processing. An incoming feature vector is received by the system and processed by the ASR engine 258 using acoustic model 253. The output of that processing may give certain scores for the acoustic units represented in the input labels of the arcs outgoing from state 0, for example:

unit 10, acoustic score $s_1$
unit 4, acoustic score $s_2$
unit 5480, acoustic score $s_3$
unit 16, acoustic score $s_4$
unit 2, acoustic score $s_5$ The ASR engine 258 may then take acoustic score $s_1$ and use it to adjust the existing score (0.84451) of arc 402 (which corresponds to unit 10). The scores may be added together, multiplied, or any other technique of combination. The resulting combined score may then be maintained by the system as the processed score corresponding to arc 402. The same process may be performed for each of the arcs outgoing from state 0 (as each of them have an input label corresponding to an acoustic unit) based on the scores corresponding to the acoustic units of their respective input labels, thus resulting in:

Updated score for 402=0.84451+($s_1$*sf)

Updated score for 404=0.84451+($s_2$*sf)

Updated score for 406=−0.22287+($s_3$*sf)

Updated score for 408=−1.5979+($s_4$*sf)

Updated score for 410=−1.5979+($s_5$*sf)

where sf is a scaling factor configured to adjust the acoustic scores so that they can be added to the scores of the FST. The scaling factor may be based on the particular acoustic model and/or FST. The same scaling factor may also be used to adjust each of the acoustic scores.

The destination states for the arcs processed (for example, states 1-5), may then be held in memory while the ASR engine 258 processes the next incoming feature vector corresponding to the next audio frame. The above process will then be repeated, so the acoustic model processing will output acoustic units with corresponding scores, the engine 258 will identify the corresponding units in input labels in arcs outgoing from FST states under consideration by the engine 258, the combines scores will be determined and stored. The process will continue in this manner for all input audio.

As the ASR engine 258 traverses the FST it will continue traversing states and arcs until it reaches a state with an outgoing arc, where the outgoing arc includes an input label corresponding to an acoustic which, which thus means the arc requires new information from the acoustic model to be traversed. For example, the ASR engine 258 may continue to traverse arcs until it arrives at an arc that has an input label corresponding to an acoustic unit. The ASR engine 258 will then wait for the next feature vector to be processed and for further input to come from the acoustic model until it continues processing. In this manner the ASR engine will perform time-synchronous decoding and will only consider portions of the FST in a frame-by-frame manner. That is, all the portions of the FST being processed at a particular time will all correspond to the same input audio frame/feature vector.

Further, as the ASR engine 258 traverses the FST, it may accumulate the combined scores for each path of the traversed nodes and/or arcs traversed up to each point in the FST. The combined score may be a sum of the updated scores (i.e., post acoustic model scores) of each state and/or arc traversed. For example, referring to the portion of the FST shown in FIG. 4A, if the ASR engine 258 has traversed along five paths to the point where it is currently at states 7, 8, 10, 6 and 9, each path will have a combined score leading up to the that point in the path. That is, the combined score for path 1 (currently at state 7) will be the summed updated scores for the nodes and arcs leading from state 0 to state 7, the combined score for path 2 (currently at state 8) will be the summed updated scores for the nodes and arcs leading from state 0 to state 8, the combined score for path 3 (currently at state 10) will be the summed updated scores for the nodes and arcs leading from state 0 to state 10, the combined score for path 4 (currently at state 6) will be the summed updated scores for the nodes and arcs leading from state 0 to state 6, and the combined score for path 5 (currently at state 9) will be the summed updated scores for the nodes and arcs leading from state 0 to state 9.

As the ASR engine 258 operates, there are certain pruning settings that affect how many states the ASR engine 258 may consider. One such pruning setting is the beam width. The beam width is a measurement of the score difference between a best scoring state (corresponding to the particular audio frame being processed) and the cutoff point. Any states outside the pruning settings will be discarded and not considered during further ASR processing.

When the ASR engine 258 has completed processing for a particular feature vector, that is the ASR engine 258 has processed the output from the acoustic model for the feature vector and rescored all the arcs and states corresponding to the acoustic units/scores output by the acoustic model (while discarding those that fall outside the beam width), there may be a certain number of states left within the beam that have received their combined scores. (Though note that not every state/arc will receive a combined score, only those that correspond to acoustic units seen by the AM will receive a combined score.) As the ASR engine 258 will continue to traverse arcs and states until a new acoustic unit is indicated as an input label, the states remaining after processing data for a particular audio frame will have outgoing arcs that correspond to an acoustic unit. Those outgoing arcs for those states will then be considered by the ASR engine 258 as new data for the next feature vector comes from the acoustic model processing.

As the ASR engine 258 traverses the FST it may store data corresponding to the states and arcs traversed along with their combined scores. That may include a table of entries, sometimes called tokens, where each token corresponds to a state in the search space (i.e., the traversed portions of the FST that fell within the beam width and the threshold number of active states). Each token may include a score representing the likelihood that the state is reached from the beginning of the utterance up until the frame of the state. The token may also include a pointer in the table to a previous state, such as the state most likely to lead to the present state, and the arc from the most likely previous state to the present state. The token may also include the input label and output label (if any) of the arc that leads from the most likely previous state to the present state. The input label and/or output label may be a pointer to a table of labels and may indicate a phoneme, senon, word, or other speech unit. The token may also include links to more than one previous state (and corresponding scores, arcs, labels, etc.).

Figure 5:
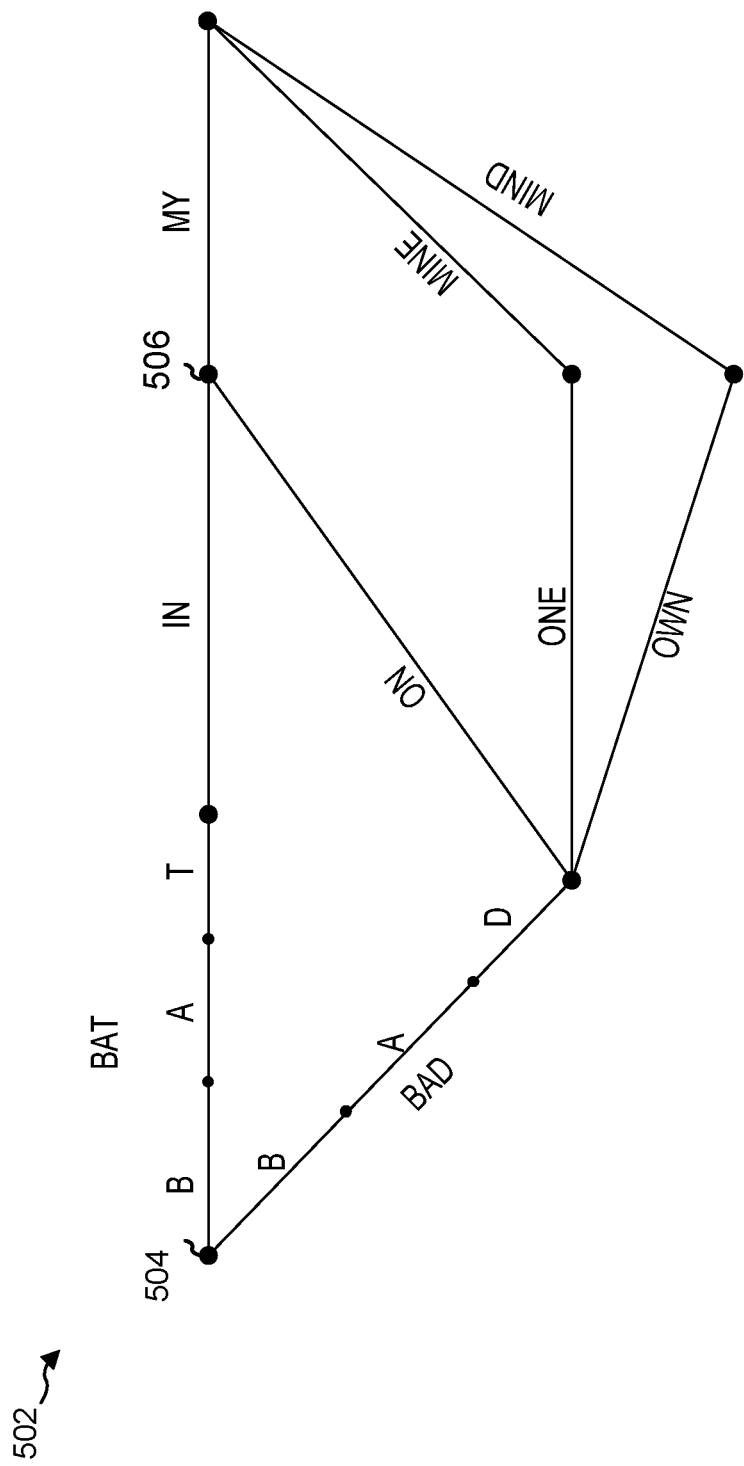
FIG. 5 illustrates a word lattice according to embodiments of the present disclosure.

As the ASR engine traverses portions of the FST, it may use the table of tokens representing the states and arcs traversed, along with their combined scores, to create a lattice of potential paths representing potential ASR results. A sample lattice is shown in FIG. 5. The lattice 502 shows multiple potential paths of speech recognition results that may have been determined by the ASR engine 258 by traversing an FST or by using different acoustic model/language model processing. Paths between large nodes represent potential words (for example "bad", "bay", etc.) and paths between smaller nodes represent potential phonemes (for example "B", "A", "T", and "B", "A", "D"). For purposes of illustration, individual phonemes are only shown for the first two words of the lattice. The two paths between node 504 and node 506 represent two potential word choices, "bat in" or "bad on". Each path point between nodes (such as a potential word) is associated with a recognition score. Each path across the lattice may also be assigned a recognition score. The highest recognition score path, where the recognition score is a combination of the acoustic model score, the language model score, and/or other factors, may be returned by the ASR engine 258 as the ASR result for the associated feature vectors. Following ASR processing, the ASR results may be sent to a downstream component, such as a command processor 290 for further processing (such as execution of a command included in the interpreted text). Thus the data preserved by the ASR engine 258 during traversal of the FST may result in a lattice representing the most likely possible ASR results (as the least likely results were discarded during pruning). The mostly likely path of the ASR results, sometimes called the Viterbi path, may be selected as the top scoring result for command execution.

As may be appreciated, larger FST may result in higher quality ASR results. The entire speech processing timeline, however, from initial receipt of the user's spoken command, to eventual execution of that command as noticed by the user may take a significant amount of computing resources to complete. Thus, to ensure desired results, the size of the combined FSTs may be large, which may increase latency and memory needed to perform ASR tasks. To reduce the size of the FST, FST compression techniques, such as those described below may be used. The techniques will allow the reduction in the size of the universe of the FST that is being searched using a general domain input. Reducing the FST size will reduce latency and streamline the speech recognition process.

FSTs can constitute the bulk of an ASR model, with HCLG being particularly large, sometimes reaching tens of gigabytes in some models. G itself may be smaller, in the order of hundreds of megabytes. When the language model G is fully known at model build time and is not too large, all four FSTs can be composed statically into a single transducer HCLG. Otherwise, the composition has to happen dynamically, at runtime (i.e., when the system is taking in audio for ASR processing). In the latter case, three FSTs H, C, and L (HCL) may be combined at model build time, while the composition of the HCL FST and the G FST happens at runtime. This configuration may be useful, for example, when using customized grammars, G. For example, a grammar G may be customized for a particular user.

Figure 4E:
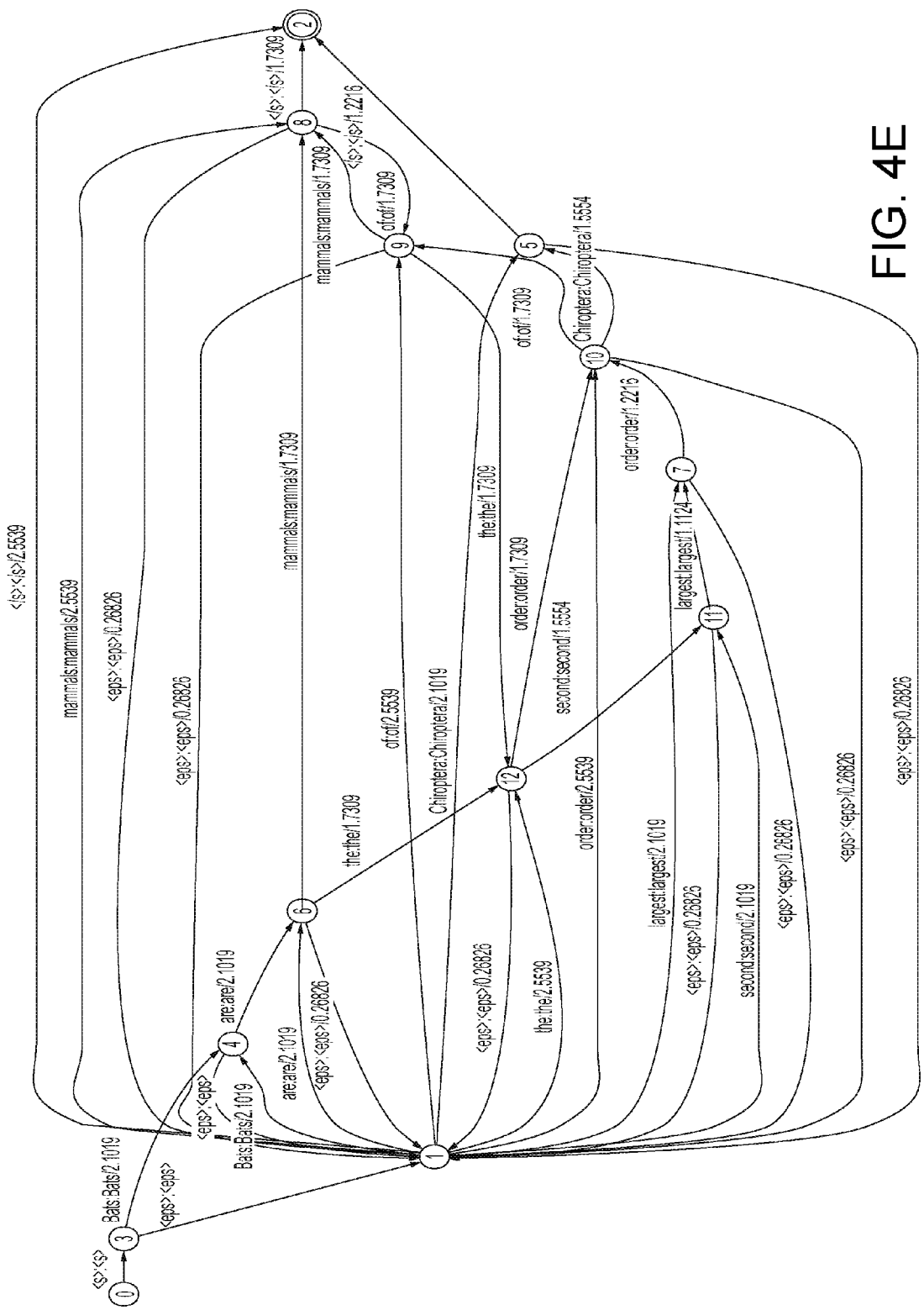
FIG. 4E illustrates a section of a finite state transducer according to embodiments of the present disclosure.

An example of a portion of a G FST is shown in FIG. 4E. The FST portion shown in FIG. 4E is a portion of a G FST language model constructed from two sentences, the first being "bats are mammals of the order Chiroptera" and the second being "bats are the second largest order of mammals." The portion of the FST shown in FIG. 4E may normally appear in a much larger FST as part of a general ASR language model, but is shown in FIG. 4E for purposes of illustration. Further, while a complete G FST may be configured to recognize any sequence of the words shown in FIG. 4E, the particular illustrated sequences may be more likely due to the construction of the FST (which itself is based on a universe of available text from a text corpus). To traverse the G FST, word outputs from an HCL FST (or other model configured to construct words from sounds output by an acoustic model) are used to determine which arcs to traverse along the G FST. As arcs are traversed, word output labels associated with those arcs are output to form the potential text output that is eventually output as the ASR result. Multiple paths through a G FST may be traversed (with respective scores) thus resulting in an N-best list output of a word string (e.g., a sentence) that potentially represents the input audio data.

Although an FST is a graphical construct as shown in FIGS. 4A-4E, when stored as data in the system, an FST may be represented as data in two or more tables. The two tables include a table of states (also called nodes) and a table of arcs. The FST may optionally include a table of input labels and a table of output labels for particular arcs, though those label tables may be stored separately (and thus not be considered part of) the FST. Though this is configurable. As an example, the state/node table may contain a record for each state/node, with each state record consisting of the following four fields:

(1) Final weight of the state,
(2) Offset in the arc array pointing to the beginning of the list of arcs outgoing from the state,
(3) Number of outgoing arcs from the particular state with an epsilon (E) input label, and
(4) Number of outgoing arcs from the particular state with an epsilon (E) output label.

Each of these fields may be represented by a particular N-bit integer (e.g., 16, 32, etc.). The integer size for a particular field may be different from that of a different field. Further, depending on system configuration, certain fields may be removed (for example fields 3 and 4) while other fields may be included.

Thus, to represent a state with many outgoing arcs (for example, state 0 in FIG. 4A) the table entry for state 0 would include a final score of state 0, a pointer to the arc table corresponding to an arc table entry for a first arc outgoing from state 0 (for example 402), a number of outgoing arcs from state 0 with a null epsilon input label and a number of outgoing arcs from state 0 with a null epsilon input label. As FIG. 4A is an incomplete portion of an FST, it does not illustrate all the arcs from state 0 and thus does not show all the arcs containing an epsilon label. Although the entry for state 0 may only include a pointer to a first outgoing arc from state 0, the arc table and state table may be organized so that the entry in the state table for the next state, e.g., state 1, includes a pointer to the arc table for the first outgoing state from state 1, e.g., arc 420. The system may thus determine that any arcs from 402 up to, but not including 420, are outgoing from state 0.

The arcs table may contain the following information for each arc:

(1) Arc weight,
(2) Next state ID (the end point of the arc)
(3) Input label (which may be a pointer to a label in a table of input labels)
(4) Output label (which may be a pointer to a label in a table of output labels)

Each of these fields may be represented by a particular N-bit integer. The integer size for a particular field may be different from that of a different field. Thus, to represent a particular arc, for example arc 420, the entry in the arc table may include an arc score (e.g., 0.13863), the next state ID for the arc (e.g., state 6), the input label (e.g., a pointer in a table of input labels to input label 18, which may correspond to a particular acoustic unit), and the output label (which is epsilon and thus may be blank, or set to a particular value that represents epsilon, or may point to an entry in the table of output labels that represents epsilon).

An HCLG FST may be constructed to have certain properties:

A large fraction of output labels may be ∈s. An ∈ label represents a null label, that is a label with no content. An HCLG FST consumes audio frames in its input (i.e., 10 milliseconds each) and outputs words. Because the average word is much longer than one frame, and because the FST may need to consume many frames to generate a word, there would normally be many fewer output labels than input labels, thus the majority of output labels for states in the HCLG FST may be ∈.

Many states have a small number of outgoing arcs. A large number of states may have only a single outgoing arc or two outgoing arcs. Thus for most states, the FST can only go from that state to a few other states. Only a small number of states have a large number (i.e., more than 10) outgoing arcs.

Many states have a self-loop. Self-loops, i.e., when the arcs ends in the same state it started, come from the HMM. They allow a phone to have an arbitrarily long duration. Many states have a self-loop.

The number of distinct input and output labels is relatively small. On the input, HCLG consumes transition IDs, which essentially encode the tuple of [senone, phone, HMM state] with tens of thousands of unique combinations. The output labels are from the system's vocabulary, which for a large vocabulary system is order of 1 million words.

Arcs are not sorted. The decoding algorithm may not make any assumptions about the ordering of arcs, therefore the system is free to reorder them to accommodate the compression algorithm.

Arcs are accessed sequentially. A decoding algorithm may scan the entire list of arcs outgoing from the current state. This means that the system need not provide fast random access. Number of input or output ∈ arcs is also not used.

Range of weights is small. Weights in transducers are typically stored in negative log-probability domain, which means that the range of weights is small. This makes quantization (i.e., binning) particularly efficient.

An HCL FST may have a number, but not necessarily all, of the above properties. For example, an HCL FST may be sorted to allow composition between the HCL FST and the G FST at runtime.

A G FST may be constructed to have certain properties:
Input and output labels may be tightly connected. For many arcs in a G FST, the input and output labels correspond to the same word.

G may be sorted by input label. One technique for online composition (i.e., combining) of HCL and G requires that each state's arcs are sorted by input label. This is used to compute fast (binary search-based) intersection(s) between the set of words that can be output from a state in HCL and the set of words accepted by a state in G.

Random arc access may be required. Because arcs are sorted, the composition algorithm uses binary array search which uses random arc access. Additionally, a composition algorithm may make use of the number of input ∈ arcs, therefore it must be either stored or computed efficiently.

Large number of input/output labels are ∈. Although G can have an arbitrary structure, a language model may be an n-gram model, the FST representation of which uses ∈ arcs for backoff. A large number of arcs may have ∈ both for input and output labels.

Many states have a small number of outgoing arcs. A large number of states may have only a single arc or two arcs. Only a small number of states have a large number (i.e., more than 10) outgoing arcs.

Range of weights across arcs of the G FST is small.

Compact HCLG FST

As noted above, full FSTs may be very large (e.g., several gigabytes). Significant computing resources are needed to traverse such large FSTs at runtime during speech processing. Those computing resources may be distributed among many speech requests, however, and as such conserving such computing resources is desirable. During training, however, computing resources may be used more freely without impacting things such as user perceived latency, etc. Thus, steps may be taken to reduce the size of FSTs in a manner that may reduce computing resources spent at runtime (such as processing resources needed to traverse large FSTs). One such step is to reduce the size of the FSTs, thus resulting in fewer computing resources needed to perform ASR processing at runtime. The compressed FSTs may be created during a training phase and thus may be ready for use during runtime processing. At runtime, an ASR request may come in and the compressed FST may be decompressed and used, as explained further below.

In order to achieve best compression, the system may make use of bit arrays, i.e., storage of all values without necessarily aligning them to a whole byte. In current processors bit operations, such as shift and mask, are less expensive (a few CPU cycles) than uncached memory access which can cost over a hundred cycles. Bit arrays can also be mapped directly into memory, a desirable property for an FST format as this speeds up loading of large models substantially.

Because weights in both HCLG and G may be from a relatively small domain, weight quantization (i.e., binning of weights into groups) can be efficiently applied. In the current implementation, a particular M bit level quantization may be used, where M may be less than N mentioned above. For linear quantization the system may store the minimum weight, the maximum weight, and the number of levels. Or the system may store the entire table in order to support more efficient (non-linear) quantization algorithms.

The system may utilize two different arrays to store states and arc information respectively. The state array may contain fixed length records with each record containing the following fields:
Quantized final weight
A Boolean flag indicating if the state is to be cached
A pointer to the bit array of arcs outgoing from this state An un-quantized weight for an arc or a state (for an uncompressed FST) may be represented by a certain number of bits (for example, 32 bits) whereas the quantized weight (which is what is stored for the compressed FST) may be represented by a certain fewer number of bits (for example, 12 bits). Thus, at compression time (either for a G or HCLG FST), to determine a quantized weight the system may determine which bin (out of $2^x$ bins, where x is the number of bits to represent the quantized weight) the un-quantized weight falls into. That bin number (as represented by the 12 bits) then becomes the quantized weight representation that is stored as part of the compact FST. At runtime, the compressed/quantized weight field may be decompressed to the full size (e.g., from 12 bits to 32 bits) so as to be the appropriate size for processing by the ASR engine 258.

The Boolean flag is a single bit field. The pointer to the bit array uses the number of bits equal to $\log_2$ of the number of arcs (i.e., enough bits to select from the index of arcs).

A decoding algorithm may work with an HCLG transducer directly which means that the implementation may reduce computational overhead as much as possible. In HCLG, the number of states with large number of arcs is small, however, during the decoding such states may be visited disproportionately frequently during ASR processing. Additionally, decompression overhead is proportional to the number of arcs, which magnifies the total decompression cost of these states. Thus, to improve efficiency of decoding and ASR processing, certain states with more than a certain number of arcs may be decompressed at model loading time and may remain decompressed in a cache for the system to refer to during decoding to avoid repeated decompression (and discarding) of such states.

For example, the system may cache states with more than 16 arcs, or some other number may be chosen. The system may employ a Boolean flag indicating whether the state is cached to avoid a lookup in the cache for the states that are not cached.

For encoding arcs, the system may use a variable length structure. As the decoder only accesses arcs sequentially, therefore only this access pattern needs to be efficient. Thus variable length coding can be applied without sacrificing runtime performance. The arc array may contain the following fields:
Three Boolean flags indicating whether the record contains (1) the input label, (2) the output label, and (3) the next state ID. In the case when input or output label is missing, ϵ is assumed. When the next state id is missing, the guessed value is assumed. A technique for guessing the next state ID is described below.
Quantized arc weight
Optional (if indicated by the flag) Input label ID (which may be a pointer to a label in a table of input labels) [e.g., a phoneme, word, or other label associated with the input label of the arc]
Optional (if indicated by the flag) Output label ID (which may be a pointer to a label in a table of output labels) [e.g., a phoneme, word, or other label associated with the output label of the arc]
Optional (if indicated by the flag) Next state ID The input label and output label may be the text of the labels themselves or may include an index entry to a table of the labels, thus resulting in a number of bits for the label being a number of bits equal to $\log_2$ of the number of labels (i.e., enough bits to select from a table storing the labels). The table(s) of labels may be stored as part of the FST or may be stored separately. At runtime, the compressed/quantized weight field may be decompressed to the full size (e.g., from 12 bits to 32 bits) so as to be the appropriate size for processing by the ASR engine 258.

The system may employ a technique to guess a next state both at FST creation time and at FST reading (i.e., decompression) time/runtime. When the compressed HCLG FST is created, the system may reorder arcs outgoing from a state in the following order: the self-loop (if present) is the first arc, the rest of arcs are sorted in the order of their next state ID. This ordering may act such that outgoing arcs with sequential next state IDs are in sequence, which allows the system to guess self-loops and sequentially numbered next state IDs correctly and thus avoid storing them in the FST file. Thus the system may guess a next state using the following procedure:
input: State
NextStateGuess State.id;
yield (NextStateGuess);
for arc E State.arcs do
NextStateGuess arc.next state+1;
yield (NextStateGuess);
end
where arc.nextstate+1 is the next state in the uncompressed FST from the state under consideration (State).

The above estimation technique may be used during training to estimate what a next state for a state would be. If, during training, the estimation technique (be it the above technique or a different technique) correctly estimates the next state, then the system may not insert a next state ID in the next state ID field and may instead leave that field empty (thus preserving the memory that would otherwise have been used to record the state ID. To determine the next state ID at runtime, the ASR engine 258 is configured to be able to run the same estimation technique and thus arrive at the same estimate of the next state ID for a particular state. Thus, if during runtime the ASR engine 258 determines the next state ID field is empty, the ASR engine 258 may run the estimation technique to guess the next state ID and may be confident that the guess is correct, because the system only would leave the next state ID field is empty for states where the estimation technique was successful. Thus the system may further save memory for the compact FST. If, during training, the estimation technique does not correctly estimate the next state, the system may insert the next state ID into the next state ID field for that particular state in the compact FST so the system knows the next state ID at runtime.

The HCLG FST may be constructed in a manner to make the above estimation technique more efficient, for example by sorting tables of the FST in a manner that would favor states connected by outgoing arcs to have sequential state IDs. Thus at training certain techniques may be used to improve the performance of the estimation technique.

Different estimation techniques may be used to estimate the next state. In one embodiment, each compact FST may be associated with a particular estimation technique. During runtime the system may determine the estimation techniques associated with the compact FST and may use that particular technique to estimate the next state.

Thus, the compact HCLG FST may comprise (1) a state array with a plurality of records, where each record in the state array corresponds to a state and each record includes (a) a quantized final weight of the respective state, (b) a Boolean flag indicating whether the state is to be cached, and (c) one or more indicators, where each indicator points to an arc in the arc array that is an outgoing arc from this state. The compact HCLG FST may also comprise (2) an arc array with a plurality of records, where each record in the arc array corresponds to an arc and each record includes (a) three Boolean flags indicating whether the record contains (i) the input label, (ii) the output label, and (iii) the next state ID, (b) the quantized arc weight, (c) (optional, if indicated by flag i) the input label for the respective arc, (d) (optional, if indicated by flag ii) the output label for the respective arc, and/or (e) (optional, if indicated by flag iii) the next state ID for the respective arc. The compact HCLG FST may thus be significantly smaller than an uncompressed HCLG FST, potentially in the range of 50% smaller.

Compact G FST

The system may use three bit arrays to represent G transducer: the array of input/output label pairs, the states array, and the arcs array. The input/output label pairs array contains the unique pairs of input/output labels. Because the labels are closely related, the number of unique pairs is only slightly larger than the number of unique input or output labels. The arcs array may contain the list of arcs, with the following information for each compressed arc:

Quantized arc weight (quantized, for example, in the manner described above)
Index to input/output label pair array or single label array
Next state ID For a G FST, unlike for a HCLG format, the system may use fixed length arc representation. One reason for doing so is the desire to provide efficient random access to arcs required by the composition algorithm. Another reason is the comparatively small potential compression benefit to gain from variable bit coding. Similarly to HCLG, the states array contains quantized final weight and a pointer to the arc array; since arcs have fixed length in G the system may use an arc index rather than bit offset.

Thus, the compact G FST may comprise (1) a state array with a plurality of records, where each record in the state array corresponds to a state and each record includes (a) a quantized final weight of the respective state, and (b) one or more indicators, where each indicator points an arc in the arc array that is an outgoing arc from this state. Optionally a state record may also have (c) a Boolean flag indicating whether the state is to be cached. The compact G FST may also comprise (2) an arc array with a plurality of records, where each record in the arc array corresponds to an arc and each record includes (a) the quantized arc weight, (b) an index in an input/output label pair array, and/or (c) the next state ID for the respective arc. The compact G FST may also comprise (3) an array indicating input/output label pairs. The compact G FST may thus be significantly smaller than an uncompressed G FST, potentially in the range of 50% smaller.

Using Compact FSTs at Runtime

A compact G FST may be composed at runtime with an HCL FST (either compressed or uncompressed, as compressing an HCL FST may not provide significant benefits) and the cost of the composition algorithm is such that computational performance of G (arc lookup speed) does not have a measurable impact on the overall performance of the decoder. HCLG, on the other hand, represents the fully instantiated search graph, and traversing may be fast. Therefore, any additional work due to FST decompression impacts decoding speed. Several implementation techniques may be used to efficiently implement an ASR system using compressed (i.e., compact) HCLG and G FSTs:

Arc iterators may be used to access arcs. One way to iterate over arcs is to provide an array of arcs in an uncompressed format. Alternatives would entail either dynamic memory allocation, which is slow, or exposing concrete FST type to the decoder which may be cumbersome.

For states with large number of arcs (over 16), the system may decompress arcs at FST loading time and cache them as mentioned above.

For all other states, the system may decompress all arcs into a pre-allocated thread-specific buffer at arc iterator initialization time and pass that buffer to the arc iterator. This method exploits the fact that the decoder only maintains one iterator at a time.

The system may have a mechanism to support multiple arc iterators at a time. This approach has a number of advantages: tight decompression cycle, no dynamic memory allocation, better cache performance due to reusing the memory.

The composition algorithm may require that G be able to compute the number of input $\epsilon$ arcs leaving a state. As G is sorted by input label, therefore, arcs with $\epsilon$ input must be in the beginning of the list of arcs. Thus, the system computes the number instead of storing it, as it can be efficiently calculated by iterating over the list of arcs.

At runtime, an ASR request may be received by the system where the request includes audio data to be processed using ASR. The ASR engine 258 takes the audio data (which may include audio feature vectors), processes the audio data with an acoustic model to obtain acoustic units and corresponding scores, and uses those units and scores to traverse the FST. To traverse a compact FST, the compact FST is loaded into memory of the server 120. As the ASR engine 258 traverses the compact FST, the engine 258 decompresses the states and arcs that the engine 258 is about to traverse. This may involve decompressing the quantized weights or other data from the individual entries in the state/arc tables. The weights will be decompressed to a size the ASR engine 258 is configured to process (for example, 32 bits long). As each state/arc is traversed, the system will decompress the appropriate information about the state/arc, perform ASR processing as normal, maintain in memory the data needed to continue traversing the FST and discard from memory the pruned portions.

Thus, the engine 258 may not necessarily decompress the entire compressed FST, but rather will decompress the portion of the FST (including data related to the states and arcs) which are encountered during that processing of that particular portion of the input audio. As the engine 258 traverses the FST it will discard (i.e., no longer track in memory) previously processed states or arcs that do not fall within the pruning thresholds, such as portions of a path that do not fall within a configured beam width (e.g., score threshold) or threshold number of active states. Thus, during ASR processing with compressed FST(s), the ASR engine 258 may include in memory the active portions of previously processed paths that fall within the pruning thresholds, the decompressed arcs and paths that are currently being processed for a particular audio frame, and the remainder of the compressed FST(s) that have yet to be decompressed and traversed. With uncompressed FST(s), the ASR engine 258 may include in memory the remainder of the uncompressed FST(s) that would yet to have been traversed. The uncompressed FST is much larger than the compressed FST. Further, the computing resources used to perform ASR using uncompressed FSTs is greater than the computing resources used to perform ASR using compressed FSTs, even with the additional processing needed to decompress certain arcs or states during ongoing ASR processing. Thus using the compressed, compact FST results in a reduction of computing resources during ASR processing.

As noted above, as the ASR engine 258 traverses the compact FST, the engine 258 decompresses the states and arcs that the engine 258 is about to traverse. This may include processing a current arc or state, determining a plurality of potential destination states (compressed) and/or a plurality of potential outgoing arcs (compressed) from the current arc or state and decompressing that plurality of potential destination states/outgoing arcs. To decompress the compressed states or arcs, the system. The system will then determine scores associated with the decompressed states or arcs (i.e., by using a next incoming acoustic unit and corresponding score). The system will then prune the decompressed states or arcs that fall outside pruning threshold(s), preserve the remainder, and continue the process with the next plurality of potential destination states (compressed) and/or a plurality of potential outgoing arcs (compressed) for further audio frames and so on until ASR processing is complete.

In certain situations, a certain next compressed arc or compressed state may be below a score threshold such that the ASR engine 258 skips that particular compressed arc or compressed state entirely, thus resulting in that particular compressed arc or compressed state not being decompressed.

As noted above, for certain arcs/states (such as states that have a large number of outgoing arcs) the system may not compress those states when constructing the compact FST during training. Thus even the compact FST may have a number of uncompressed arcs/states. Leaving such arcs/states uncompressed (particularly for frequently used arcs/states) may allow for faster ASR processing at runtime. The system may cache such uncompressed arcs/states and may indicate which arcs/states are uncompressed using a Boolean flag and lookup table (or other mechanism). Further, during ASR processing these particular (or other particular) arc/states may not be discarded, but rather preserved (such as in the cache) for future use during the processing task if needed.

During ASR processing using a compressed FST, the system will take as inputs the compressed FST(s) (either an HCLG FST or a combination of an HCL FST and a G FST), the table of arcs, the table of states and incoming audio data (which is then processed using the acoustic model to acoustic unit data, such as an N-best list of speech units and corresponding scores. The system will then operate on those inputs to output ASR results (such as a word sequence) as described above.

Figure 6:
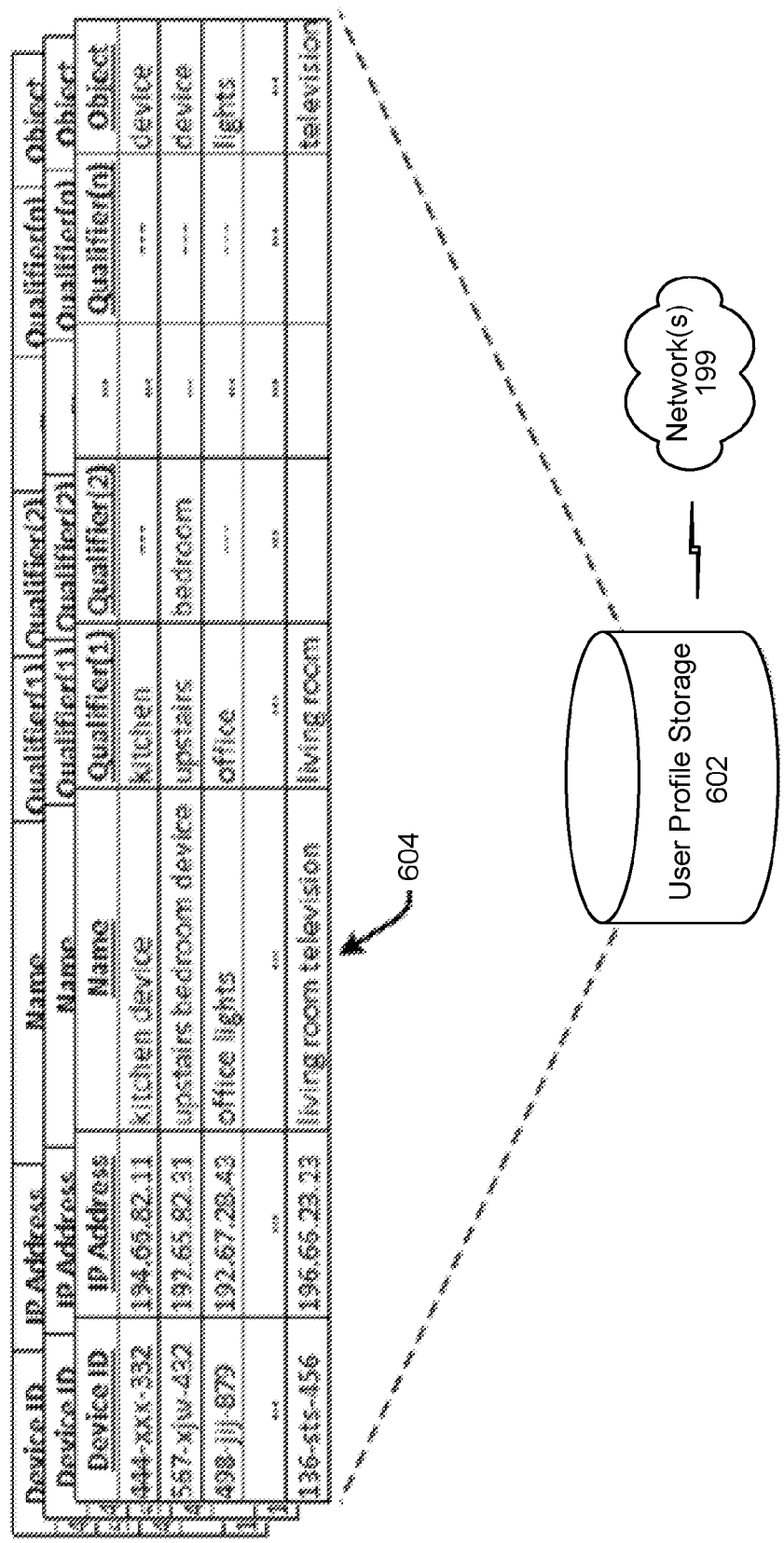
FIG. 6 illustrates data stored and associated with user profiles according to embodiments of the present disclosure.

The server 120 may include or reference data regarding user accounts, shown by the user profile storage 602 illustrated in FIG. 6. The user profile storage may be located proximate to server 120, or may otherwise be in communication with various components, for example over network 165. The user profile storage 602 may include a variety of information related to individual users, households, accounts, etc. that interact with the system 100. For illustration, as shown in FIG. 6, the user profile storage 602 may include data regarding the devices associated with particular individual user accounts 604. In an example, the user profile storage 602 is a cloud-based storage. Such data may include device identifier (ID) and internet protocol (IP) address information for different devices as well as names by which the devices may be referred to by a user. Further qualifiers describing the devices may also be listed along with a description of the type of object of the device. For example, user preferences regarding commands can be stored by the server 120. Such user preferences can be used by the server 120 to answer queries as described herein. The user profile storage 602 may also include a customized grammar G that may be processed and stored as a compact G FST that may be used to process incoming ASR requests for a user associated with the user profile.

The compressed FSTs described above may be used in a variety of ways to improve and allow speech processing. For example, a compressed FST may be stored in a client device configured to capture audio and may be used to perform speech processing on the client device using fewer computing resources than may be traditionally used for speech processing using a client-server model For example, the client device may be an appliance that resides in a user home (such as a stereo component, refrigerator, internet connectivity device or the like) or may be configured as part of a vehicle, such as an automobile. A compressed FST may be activated (e.g., portions of it decompressed and stored into memory to be used for forthcoming speech processing) in response to various activities proximate to the client device such as detecting a wakeword, starting a car, detection of approaching voices, receiving an indication that a button on the client device to receive audio for speech processing was pushed, etc. Further, the compressed FST may be activated in response to a signal from a remote system or component, for example an indication that a timer alarm is about to sound (which may then be followed by a spoken command to deactivate or delay the timer alarm), an indication that a delivery person is approaching a home (which may then be followed by a spoken indication from the delivery person of parcel delivery), or the like. After portions of the compressed FST are activated, speech processing may occur and then the decompressed portions of the FST may be purged from memory. Then, at a later time, portions of the compressed FST may again be decompressed and loaded into memory as needed.

Figure 7:
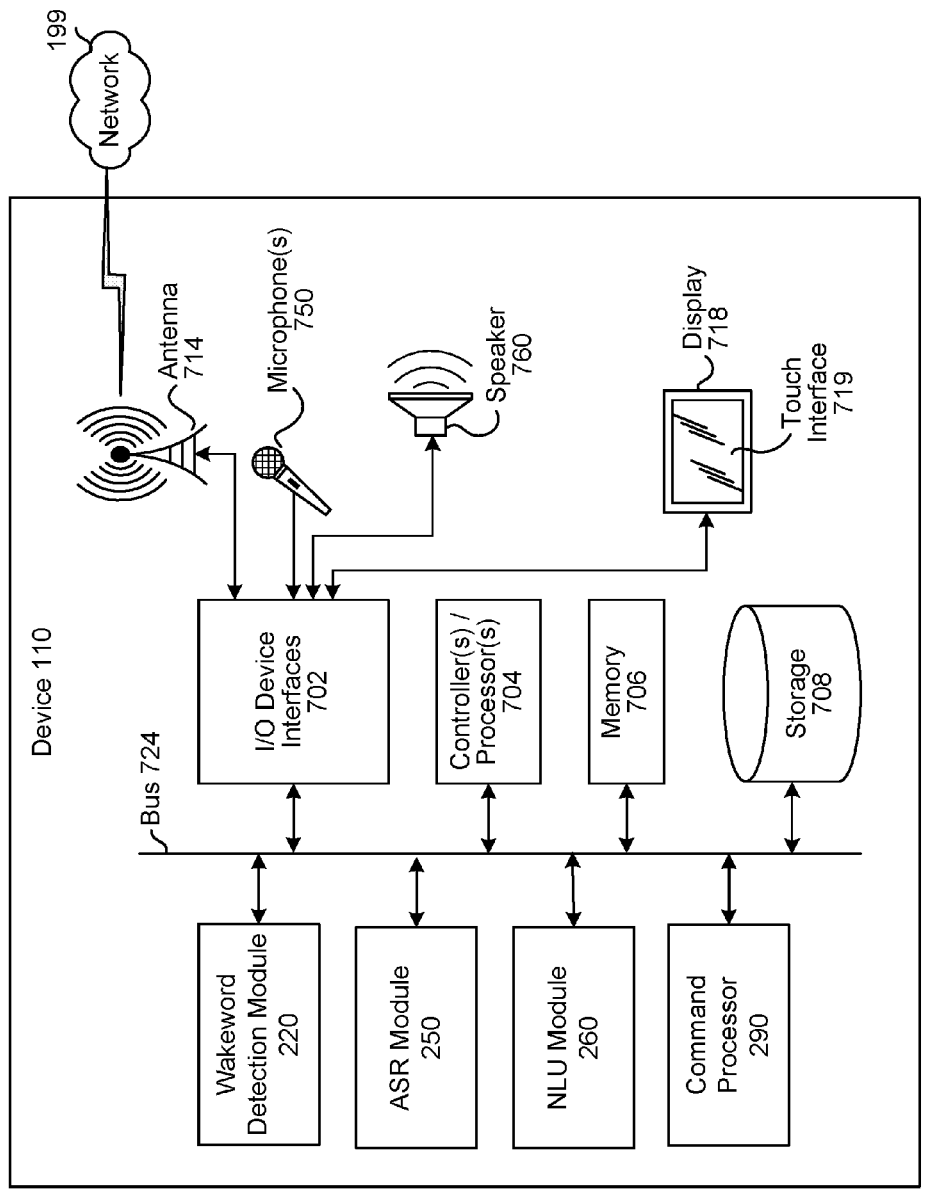
FIG. 7 is a block diagram conceptually illustrating example components of a device according to embodiments of the present disclosure.

FIG. 7 is a block diagram conceptually illustrating a local device 110 that may be used with the described system. FIG. 8 is a block diagram conceptually illustrating example components of a remote device, such as a remote server 120 that may assist with ASR, NLU processing, or command processing. Multiple such servers 120 may be included in the system, such as one server(s) 120 for training ASR models, one server(s) for performing ASR, one server(s) 120 for performing NLU, etc. In operation, each of these devices (or groups of devices) may include computer-readable and computer-executable instructions that reside on the respective device (110/120), as will be discussed further below.

Each of these devices (110/120) may include one or more controllers/processors (504/604), that may each include a central processing unit (CPU) for processing data and computer-readable instructions, and a memory (506/606) for storing data and instructions of the respective device. The memories (506/606) may individually include volatile random access memory (RAM), non-volatile read only memory (ROM), non-volatile magnetoresistive (MRAM) and/or other types of memory. Each device may also include a data storage component (508/608), for storing data and controller/processor-executable instructions. Each data storage component may individually include one or more non-volatile storage types such as magnetic storage, optical storage, solid-state storage, etc. Each device may also be connected to removable or external non-volatile memory and/or storage (such as a removable memory card, memory key drive, networked storage, etc.) through respective input/output device interfaces (502/602).

Computer instructions for operating each device (110/120) and its various components may be executed by the respective device's controller(s)/processor(s) (504/604), using the memory (506/606) as temporary "working" storage at runtime. A device's computer instructions may be stored in a non-transitory manner in non-volatile memory (506/606), storage (508/608), or an external device(s). Alternatively, some or all of the executable instructions may be embedded in hardware or firmware on the respective device in addition to or instead of software.

Each device (110/120) includes input/output device interfaces (502/602). A variety of components may be connected through the input/output device interfaces, as will be discussed further below. Additionally, each device (110/120) may include an address/data bus (524/624) for conveying data among components of the respective device. Each component within a device (110/120) may also be directly connected to other components in addition to (or instead of) being connected to other components across the bus (524/624).

Referring to the device 110 of FIG. 7, the device 110 may include a display 718, which may comprise a touch interface 719. Or the device 110 may be "headless" and may primarily rely on spoken commands for input. As a way of indicating to a user that a connection between another device has been opened, the device 110 may be configured with a visual indicator, such as an LED or similar component (not illustrated), that may change color, flash, or otherwise provide visual indications by the device 110. The device 110 may also include input/output device interfaces 702 that connect to a variety of components such as an audio output component such as a speaker 760, a wired headset or a wireless headset (not illustrated) or other component capable of outputting audio. The device 110 may also include an audio capture component. The audio capture component may be, for example, a microphone 750 or array of microphones, a wired headset or a wireless headset (not illustrated), etc. The microphone 750 may be configured to capture audio. If an array of microphones is included, approximate distance to a sound's point of origin may be performed acoustic localization based on time and amplitude differences between sounds captured by different microphones of the array. The device 110 (using microphone 750, wakeword detection module 220, ASR module 250, etc.) may be configured to determine audio data corresponding to detected audio data. The device 110 (using input/output device interfaces 702, antenna 714, etc.) may also be configured to transmit the audio data to server 120 for further processing or to process the data using internal components such as a wakeword detection module 220.

For example, via the antenna(s), the input/output device interfaces 702 may connect to one or more networks 199 via a wireless local area network (WLAN) (such as WiFi) radio, Bluetooth, and/or wireless network radio, such as a radio capable of communication with a wireless communication network such as a Long Term Evolution (LTE) network, WiMAX network, 3G network, etc. A wired connection such as Ethernet may also be supported. Through the network(s) 199, the speech processing system may be distributed across a networked environment.

The device 110 and/or server 120 may include an ASR module 250. The ASR module in device 110 may be of limited or extended capabilities. The ASR module 250 may include the language models 254 stored in ASR model storage component 252, and an ASR module 250 that performs the automatic speech recognition process. If limited speech recognition is included, the ASR module 250 may be configured to identify a limited number of words, such as keywords detected by the device, whereas extended speech recognition may be configured to recognize a much larger range of words.

The device 110 and/or server 120 may include a limited or extended NLU module 260. The NLU module in device 110 may be of limited or extended capabilities. The NLU module 260 may comprising the name entity recognition module 262, the intent classification module 264 and/or other components. The NLU module 260 may also include a stored knowledge base and/or entity library, or those storages may be separately located.

The device 110 and/or server 120 may also include a command processor 290 that is configured to execute commands/functions associated with a spoken command as described above.

The device 110 may include a wakeword detection module 220, which may be a separate component or may be included in an ASR module 250. The wakeword detection module 220 receives audio signals and detects occurrences of a particular expression (such as a configured keyword) in the audio. This may include detecting a change in frequencies over a specific period of time where the change in frequencies results in a specific audio signature that the system recognizes as corresponding to the keyword. Keyword detection may include analyzing individual directional audio signals, such as those processed post-beamforming if applicable. Other techniques known in the art of keyword detection (also known as keyword spotting) may also be used. In some embodiments, the device 110 may be configured collectively to identify a set of the directional audio signals in which the wake expression is detected or in which the wake expression is likely to have occurred.

The wakeword detection module 220 receives captured audio and processes the audio (for example, using model(s) 232) to determine whether the audio corresponds to particular keywords recognizable by the device 110 and/or system 100. The storage 708 may store data relating to keywords and functions to enable the wakeword detection module 220 to perform the algorithms and methods described above. The locally stored speech models may be preconfigured based on known information, prior to the device 110 being configured to access the network by the user. For example, the models may be language and/or accent specific to a region where the user device is shipped or predicted to be located, or to the user himself/herself, based on a user profile, etc. In an aspect, the models may be pre-trained using speech or audio data of the user from another device. For example, the user may own another user device that the user operates via spoken commands, and this speech data may be associated with a user profile. The speech data from the other user device may then be leveraged and used to train the locally stored speech models of the device 110 prior to the user device 110 being delivered to the user or configured to access the network by the user. The wakeword detection module 220 may access the storage 708 and compare the captured audio to the stored models and audio sequences using audio comparison, pattern recognition, keyword spotting, audio signature, and/or other audio processing techniques.

The server may include a model training component 870. The model training component may be used to create the compressed FSTs discussed above.

As noted above, multiple devices may be employed in a single speech processing system. In such a multi-device system, each of the devices may include different components for performing different aspects of the speech processing. The multiple devices may include overlapping components. The components of the devices 110 and server 120, as illustrated in FIGS. 7 and 8, are exemplary, and may be located a stand-alone device or may be included, in whole or in part, as a component of a larger device or system.

As illustrated in FIG. 9 multiple devices (120, 120x, 110a to 1100 may contain components of the system 100 and the devices may be connected over a network 199. Network 199 may include a local or private network or may include a wide network such as the internet. Devices may be connected to the network 199 through either wired or wireless connections. For example, a speech controlled device 110a, a tablet computer 110b, a smart phone 110c, a refrigerator 110d, a smart watch 110e, and/or a vehicle 110f may be connected to the network 199 through a wireless service provider, over a WiFi or cellular network connection or the like. Other devices are included as network-connected support devices, such as a server 120, application developer devices 120x, or others. The support devices may connect to the network 199 through a wired connection or wireless connection. Networked devices 110 may capture audio using one-or-more built-in or connected microphones 750 or audio capture devices, with processing performed by ASR, NLU, or other components of the same device or another device connected via network 199, such as an ASR 250, NLU 260, etc. of one or more servers 120.

The concepts disclosed herein may be applied within a number of different devices and computer systems, including, for example, general-purpose computing systems, speech processing systems, and distributed computing environments.

The above aspects of the present disclosure are meant to be illustrative. They were chosen to explain the principles and application of the disclosure and are not intended to be exhaustive or to limit the disclosure. Many modifications and variations of the disclosed aspects may be apparent to those of skill in the art. Persons having ordinary skill in the field of computers and speech processing should recognize that components and process steps described herein may be interchangeable with other components or steps, or combinations of components or steps, and still achieve the benefits and advantages of the present disclosure. Moreover, it should be apparent to one skilled in the art, that the disclosure may be practiced without some or all of the specific details and steps disclosed herein.

Aspects of the disclosed system may be implemented as a computer method or as an article of manufacture such as a memory device or non-transitory computer readable storage medium. The computer readable storage medium may be readable by a computer and may comprise instructions for causing a computer or other device to perform processes described in the present disclosure. The computer readable storage media may be implemented by a volatile computer memory, non-volatile computer memory, hard drive, solid-state memory, flash drive, removable disk and/or other media. In addition, components of one or more of the modules and engines may be implemented as in firmware or hardware, such as the acoustic front end 256, which comprise among other things, analog and/or digital filters (e.g., filters configured as firmware to a digital signal processor (DSP)).

As used in this disclosure, the term "a" or "one" may include one or more items unless specifically stated otherwise. Further, the phrase "based on" is intended to mean "based at least in part on" unless specifically stated otherwise.

What is claimed is:

1. A computer-implemented method for creating and using a compact finite state transducer for automatic speech recognition, the method comprising:
   during a training period:
      identifying a first representation of a finite state transducer (FST) for automatic speech recognition (ASR), wherein the FST corresponds to an ASR grammar and is configured to be traversed using a first sequence of words with corresponding scores and output a second sequence of words with corresponding scores, wherein the first representation occupies a first amount of memory and comprises:
         a first table representing states of the FST, the first table including a first record representing a first state of the FST, the first record comprising:
            a 32 bit representation of a weight of the first state, and
            a first reference to a second record in a second table, the second record representing at least one first arc, the first arc representing a connection from the first state to another state in the FST; and
         the second table representing arcs of the FST, the second table including the second record representing the first arc, the second record comprising:
            a 32 bit representation of a weight of the first arc,
            a second reference to a third record in the first table, the third record representing a second state of the FST, the second state being a destination state for the first arc,
a first representation of an input label of the first arc, and
a second representation of an output label of the first arc; and
configuring a second representation of the FST, wherein the second representation occupies a second amount of memory less than the first amount of memory and comprises:
a third table representing at least a portion of the states of the FST, the third table including a fourth record representing the first state, the fourth record comprising:
a 12 bit representation of the weight of the first state, and
a third reference to a fifth record in a fourth table, the fifth record representing the at least one first arc;
the fourth table representing at least a portion of the arcs of the FST, the fourth table including the fifth record representing the first arc, the fifth record comprising:
a 12 bit representation of the weight of the first arc,
a third representation of an input/output label pair corresponding to the first arc, an identifier of a destination state of the first arc,
the first representation of the input label of the first arc, and
the second representation of the output label of the first arc; and
during a runtime period:
receiving audio data comprising audio feature vectors for ASR; and
determining ASR output using the second representation of the FST and the audio data.

2. The computer-implemented method of claim 1, further comprising, during the runtime period:
identifying a third representation of a second FST, wherein the second FST is an HCL FST configured to be traversed using acoustic unit data and to output words;
processing the audio data using an acoustic model to obtain acoustic unit data;
loading the third representation of the second FST into a memory;
loading the second representation of the FST into the memory;
determining a score for the fifth record using the acoustic unit data;
determining an output label using the third representation of the input/output label pair; and
determining the ASR output using the output label.

3. The computer-implemented method of claim 1, further comprising, during the training period:
identifying, using the first representation, a third state of the FST;
determining the third state is associated with a certain number of outgoing arcs;
determining that the certain number is above a threshold;
including in the third table, a sixth record corresponding to the third state, the sixth record including a bit indicating that information about the third state is available outside the third table; and
including, in the second representation, the information about the third state, the information comprising:
a 32 bit representation of a weight of the third state,
a fourth reference to a seventh record in the fourth table, the seventh record representing a second arc, the second arc outgoing from the second state in the FST,
first data representing a number of arcs associated with the third state that have a blank input label, and
second data representing a number of arcs associated with the third state that have a blank output label.

4. The computer-implemented method of claim 1, further comprising, during the runtime period:
receiving an indication to capture audio for speech processing;
loading the 12 bit representation of the weight of the first state into memory;
converting the 12 bit representation of the weight of the first state into a second 32 bit representation of the weight of the first state;
storing the second 32 bit representation of the weight of the first state;
receiving the audio data; and
performing speech processing using the audio data and the second 32 bit representation of the weight of the first state.

5. A computer-implemented method, comprising:
receiving audio data;
identifying a first representation of a first finite state transducer (FST) for automatic speech recognition (ASR), the FST configured to be traversed using input words and to output words, the first representation including:
a first table representing states of the first FST, the first table including a first record representing a first state, the first record comprising:
a first representation of a weight of the first state, and
a reference to a second record in a second table, the second record representing a first arc;
the second table representing arcs of the first FST, the second table including the second record, the second record comprising:
a second representation of a weight of the first arc,
a 12 bit representation of the weight of the first arc,
a third representation of an input/output label pair, and
an identifier of a destination state of the first arc; and
identifying a second representation of a second FST, wherein the second FST is an FST configured to be traversed using acoustic unit data and to output words;
loading the first representation of the first FST into a memory;
loading the second representation of the second FST into the memory;
performing ASR on a first portion of the audio data using the first record and the second record;
determining an output label using the third representation of the input/output label pair; and
determining ASR output using the output label.

6. The computer-implemented method of claim 5, further comprising:
receiving an indication to capture audio for speech processing;
loading the 12 bit representation of the weight of the first state into memory;

converting the 12 bit representation of the weight of the first state into a second 32 bit representation of the weight of the first state;

storing the second 32 bit representation of the weight of the first state; and performing speech processing using the audio data and the second 32 bit representation of the weight of the first state.

7. The computer-implemented method of claim 5, further comprising loading the 12 bit representation of the weight of the first state into memory after receiving the indication but prior to receiving the audio data.

8. The computer-implemented method of claim 5, further comprising configuring the second table to include a third record corresponding to a second arc, the third record occupying a same amount of space in memory as the second record.

9. The computer-implemented method of claim 5, further comprising configuring the third representation of the input/output label pair to comprise an index entry in a third table representing input/output label pairs, the first representation of the FST including the third table.

10. The computer-implemented method of claim 5, further comprising:
configuring the first table to further comprise a fourth record corresponding to a third state, the fourth record including a bit indicating that information about the third state is available outside the first table; and
configuring the representation to further include the information about the third state, the information comprising:
a fourth representation of a weight of the third state,
a second reference to a fifth record in the second table, the fifth record representing a second arc, the second arc outgoing from the second state in the FST,
first data representing a number of arcs associated with the third state that have a blank input label, and
second data representing a number of arcs associated with the third state that have a blank output label.

11. The computer-implemented method of claim 10, further comprising:
performing ASR on a third portion of the audio data using the information about the third state; and
maintaining the information about the third state in memory after performing ASR on the third portion.

12. The computer-implemented method of claim 10, configuring the fourth record to occupy a same amount of space in memory as the first record.

13. A system, comprising:
at least one processor;
a memory device including instructions operable to be executed by the at least one processor to configure the system to:
receive audio data;
identify a first representation of a first finite state transducer (FST) for automatic speech recognition (ASR), the FST configured to be traversed using input words and to output words, the first representation including:
a first table representing states of the first FST, the first table including a first record representing a first state, the first record comprising:
a first representation of a weight of the first state, and
a reference to a second record in a second table, the second record representing a first arc;
the second table representing arcs of the first FST, the second table including the second record, the second record comprising:
a second representation of a weight of the first arc,
a 12 bit representation of the weight of the first arc,
a third representation of an input/output label pair, and
an identifier of a destination state of the first arc; and
identify a second representation of a second FST, wherein the second FST is an FST configured to be traversed using acoustic unit data and to output words;
load the first representation of the first FST into a memory;
load the second representation of the second FST into the memory;
perform ASR on a first portion of the audio data using the first record and the second record;
determine an output label using the third representation of the input/output label pair; and
determine ASR output using the output label.

14. The system of claim 13, wherein the memory device further comprises instructions that further configure the system to:
receive an indication to capture audio for speech processing;
load the 12 bit representation of the weight of the first state into memory;
convert the 12 bit representation of the weight of the first state into a second 32 bit representation of the weight of the first state;
store the second 32 bit representation of the weight of the first state; and
perform speech processing using the audio data and the second 32 bit representation of the weight of the first state.

15. The system of claim 13, wherein the memory device further comprises instructions that further configure the system to load the 12 bit representation of the weight of the first state into memory after receiving the indication but prior to receiving the audio data.

16. The system of claim 13, wherein the memory device further comprises instructions that further configure the system to configure the second table to include a third record corresponding to a second arc, the third record occupying a same amount of space in memory as the second record.

17. The system of claim 13, wherein the memory device further comprises instructions that further configure the system to configure the third representation of the input/output label pair to comprise an index entry in a third table representing input/output label pairs, the first representation of the FST including the third table.

18. The system of claim 13, wherein the memory device further comprises instructions that further configure the system to:
configure the first table to further comprise a fourth record corresponding to a third state, the fourth record including a bit indicating that information about the third state is available outside the first table; and
configure the representation to further include the information about the third state, the information comprising:
a fourth representation of a weight of the third state,
a second reference to a fifth record in the second table, the fifth record representing a second arc, the second arc outgoing from the second state in the FST, first data representing a number of arcs associated with the third state that have a blank input label, and second data representing a number of arcs associated with the third state that have a blank output label.

19. The system of claim 18, wherein the memory device further comprises instructions that further configure the system to:

perform ASR on a third portion of the audio data using the information about the third state; and maintain the information about the third state in memory after performing ASR on the third portion.

20. The system of claim 18, wherein the memory device further comprises instructions that further configure the system to configure the fourth record to occupy a same amount of space in memory as the first record.

* * * * *